US011726336B2

(12) United States Patent
Gollier et al.

(10) Patent No.: US 11,726,336 B2
(45) Date of Patent: Aug. 15, 2023

(54) ACTIVE ZONAL DISPLAY ILLUMINATION USING A CHOPPED LIGHTGUIDE

(71) Applicant: META PLATFORMS TECHNOLOGIES, LLC, Menlo Park, CA (US)

(72) Inventors: Jacques Gollier, Sammamish, WA (US); Fenglin Peng, Redmond, WA (US); Ying Geng, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 316 days.

(21) Appl. No.: 16/941,337

(22) Filed: Jul. 28, 2020

(65) Prior Publication Data

US 2021/0072551 A1     Mar. 11, 2021

Related U.S. Application Data

(60) Provisional application No. 62/898,453, filed on Sep. 10, 2019.

(51) Int. Cl.
*G02B 27/01* (2006.01)
*G02B 27/28* (2006.01)
(Continued)

(52) U.S. Cl.
CPC ..... *G02B 27/0176* (2013.01); *G02B 27/0172* (2013.01); *G02B 27/283* (2013.01);
(Continued)

(58) Field of Classification Search
CPC ............ G02B 27/0176; G02B 27/0172; G02B 27/283; G02B 27/015; G02B 27/0152; G02B 27/0178; G02F 1/0136; G02F 1/137
(Continued)

(56) References Cited

U.S. PATENT DOCUMENTS

| 5,797,668 A | 8/1998 | Kojima et al. |
| 6,075,651 A | 6/2000 | Hoppe |

(Continued)

FOREIGN PATENT DOCUMENTS

| EP | 1358765 A1 | 11/2003 |
| FR | 2690534 A1 | 10/1993 |

(Continued)

OTHER PUBLICATIONS

Facebook Technologies, LLC, Invitation to Pay Additional Fees, PCT/US2020/033688, dated Sep. 8, 2020, 16 pgs.

(Continued)

*Primary Examiner* — Collin X Beatty
*Assistant Examiner* — Grant A Gagnon
(74) *Attorney, Agent, or Firm* — Morgan, Lewis & Bockius LLP

(57) ABSTRACT

An optical device includes a substrate, a plurality of optical elements positioned on the substrate, and one or more switchable cells. A respective optical element of the plurality of optical elements is configured to redirect light having a first polarization and transmit light having a second polarization orthogonal to the first polarization. The plurality of optical elements includes a first optical element located on a first region of the substrate and a second optical element located on a second region of the substrate. A respective switchable cell of the one or more switchable cells includes optically anisotropic molecules. The one or more switchable cells include a first switchable cell located on a first cell location of the substrate between the first region and the second region of the substrate. Also disclosed are a display device including the optical device and a method performed by the optical device.

19 Claims, 20 Drawing Sheets

(51) Int. Cl.
*G02F 1/01* (2006.01)
*G02F 1/137* (2006.01)

(52) U.S. Cl.
CPC ............ *G02F 1/0136* (2013.01); *G02F 1/137* (2013.01); *G02B 2027/015* (2013.01); *G02B 2027/0152* (2013.01); *G02B 2027/0178* (2013.01)

(58) Field of Classification Search
USPC ........................................................ 359/253
See application file for complete search history.

(56) References Cited

U.S. PATENT DOCUMENTS

| | | |
|---|---|---|
| 6,094,242 A | 7/2000 | Yamanaka |
| 6,104,454 A | 8/2000 | Hiyama et al. |
| 6,373,603 B1 | 4/2002 | Popovich et al. |
| 6,563,638 B2 | 5/2003 | King et al. |
| 6,829,095 B2 | 12/2004 | Amitai |
| 7,175,332 B2 | 2/2007 | Tang |
| 7,573,640 B2 | 8/2009 | Nivon et al. |
| 7,946,708 B2 | 5/2011 | Sakata et al. |
| 7,976,208 B2 | 7/2011 | Travis et al. |
| 8,079,718 B1 | 12/2011 | Zhai et al. |
| 8,305,690 B2 | 11/2012 | Ruhle et al. |
| 8,570,656 B1 | 10/2013 | Weissman |
| 8,643,822 B2 * | 2/2014 | Tan .......................... G03H 1/22 349/129 |
| 8,698,713 B2 | 4/2014 | Hajjar et al. |
| 8,724,206 B2 | 5/2014 | Spitzer et al. |
| 8,941,559 B2 | 1/2015 | Bar-Zeev et al. |
| 8,964,298 B2 | 2/2015 | Haddick et al. |
| 9,087,471 B2 | 7/2015 | Miao |
| 9,225,971 B2 | 12/2015 | Woodgate et al. |
| 9,251,745 B2 | 2/2016 | Sprague |
| 9,507,066 B2 | 11/2016 | Kollin et al. |
| 9,519,084 B1 | 12/2016 | Thomas |
| 9,557,568 B1 | 1/2017 | Ouderkirk et al. |
| 10,095,036 B2 | 10/2018 | Carollo et al. |
| 10,241,330 B2 | 3/2019 | Popovich et al. |
| 10,274,805 B2 | 4/2019 | Tabirian et al. |
| 10,353,210 B2 | 7/2019 | Wyrwas et al. |
| 10,429,647 B2 | 10/2019 | Gollier et al. |
| 10,495,798 B1 | 12/2019 | Peng et al. |
| 10,578,873 B2 | 3/2020 | Lee et al. |
| 10,634,907 B1 | 4/2020 | Geng et al. |
| 10,663,745 B2 | 5/2020 | Ouderkirk et al. |
| 10,976,551 B2 | 4/2021 | Cobb |
| 10,996,466 B2 | 5/2021 | Amirsolaimani et al. |
| 11,002,970 B2 | 5/2021 | Martinez et al. |
| 11,022,803 B2 | 6/2021 | Lee |
| 11,054,648 B2 | 7/2021 | Carollo et al. |
| 11,067,810 B2 | 7/2021 | Yonekubo et al. |
| 11,086,127 B2 | 8/2021 | Nishiyama et al. |
| 11,269,123 B2 | 3/2022 | Sharp et al. |
| 2004/0108971 A1 | 6/2004 | Waldern et al. |
| 2004/0109208 A1 | 6/2004 | Amanai et al. |
| 2005/0123229 A1 | 6/2005 | Huck et al. |
| 2006/0221448 A1 | 10/2006 | Nivon et al. |
| 2008/0252832 A1 | 10/2008 | Nieuwkerk et al. |
| 2010/0053121 A1 | 3/2010 | Sprague |
| 2010/0103078 A1 | 4/2010 | Mukawa et al. |
| 2010/0302803 A1 | 12/2010 | Bita et al. |
| 2011/0043142 A1 | 2/2011 | Travis et al. |
| 2011/0096100 A1 | 4/2011 | Sprague |
| 2011/0187293 A1 | 8/2011 | Travis |
| 2012/0069031 A1 | 3/2012 | Bita et al. |
| 2013/0101253 A1 | 4/2013 | Popovich et al. |
| 2013/0201094 A1 | 8/2013 | Travis et al. |
| 2013/0314793 A1 | 11/2013 | Robbins et al. |
| 2014/0160543 A1 | 6/2014 | Putilin et al. |
| 2014/0168034 A1 | 6/2014 | Luebke et al. |
| 2014/0267875 A1 | 9/2014 | Gruhlke et al. |
| 2014/0268879 A1 | 9/2014 | Mizuyama et al. |
| 2015/0235460 A1 | 8/2015 | Schowengerdt et al. |
| 2015/0378074 A1 | 12/2015 | Kollin et al. |
| 2016/0026253 A1 | 1/2016 | Bradski et al. |
| 2016/0033698 A1 | 2/2016 | Escuti et al. |
| 2016/0209576 A1 | 7/2016 | Robinson et al. |
| 2016/0363777 A1 | 12/2016 | Flynn et al. |
| 2017/0016594 A1 | 1/2017 | Di Trapani et al. |
| 2017/0068102 A1 | 3/2017 | Wong et al. |
| 2017/0153454 A1 | 6/2017 | Callier et al. |
| 2017/0255015 A1 | 9/2017 | Geng et al. |
| 2017/0285347 A1 | 10/2017 | Cai et al. |
| 2017/0293148 A1 | 10/2017 | Park et al. |
| 2017/0336552 A1 | 11/2017 | Masuda et al. |
| 2018/0029319 A1 | 2/2018 | Kalima et al. |
| 2018/0088325 A1 | 3/2018 | Brown et al. |
| 2018/0107007 A1 | 4/2018 | Wyrwas et al. |
| 2018/0172988 A1 | 6/2018 | Ahmed et al. |
| 2018/0180788 A1 | 6/2018 | Ambur et al. |
| 2018/0239145 A1 | 8/2018 | Lanman et al. |
| 2018/0239147 A1 | 8/2018 | Schowengerdt et al. |
| 2018/0267222 A1 | 9/2018 | Ambur et al. |
| 2018/0335629 A1 | 11/2018 | Cheng et al. |
| 2018/0364482 A1 | 12/2018 | Georgiou et al. |
| 2019/0018245 A1 | 1/2019 | Cheng et al. |
| 2019/0018480 A1 | 1/2019 | Aleem et al. |
| 2019/0018481 A1 | 1/2019 | Aleem et al. |
| 2019/0025602 A1 | 1/2019 | Qin et al. |
| 2019/0041642 A1 | 2/2019 | Haddick et al. |
| 2019/0060602 A1 | 2/2019 | Tran et al. |
| 2019/0072767 A1 | 3/2019 | Vallius et al. |
| 2019/0094549 A1 | 3/2019 | Nicholson et al. |
| 2019/0212573 A1 | 7/2019 | Popovich et al. |
| 2019/0235235 A1 | 8/2019 | Ouderkirk et al. |
| 2019/0265477 A1 | 8/2019 | Perreault et al. |
| 2019/0353906 A1 | 11/2019 | Gollier et al. |
| 2019/0369403 A1 | 12/2019 | Leister |
| 2020/0041790 A1 | 2/2020 | Martinez et al. |
| 2020/0050008 A1 | 2/2020 | Seo et al. |
| 2020/0089002 A1 | 3/2020 | Lee |
| 2020/0096816 A1 | 3/2020 | Lee et al. |
| 2020/0124858 A1 | 4/2020 | Cakmakci |
| 2020/0133005 A1 | 4/2020 | Yonekubo et al. |
| 2020/0133017 A1 | 4/2020 | Ide |
| 2020/0209667 A1 | 7/2020 | Sharlin et al. |
| 2020/0249480 A1 | 8/2020 | Martinez et al. |
| 2020/0310024 A1 | 10/2020 | Danziger et al. |
| 2020/0310537 A1 | 10/2020 | Simmons |
| 2020/0348530 A1 | 11/2020 | Xiao et al. |
| 2020/0371280 A1 | 11/2020 | Geng et al. |
| 2020/0371387 A1 | 11/2020 | Gollier et al. |
| 2020/0371388 A1 | 11/2020 | Geng et al. |
| 2020/0371389 A1 | 11/2020 | Geng et al. |
| 2020/0379226 A1 | 12/2020 | Steiner et al. |
| 2021/0080726 A1 | 3/2021 | Geng et al. |
| 2021/0271082 A1 | 9/2021 | Smith et al. |
| 2021/0278679 A1 | 9/2021 | Ouderkirk et al. |
| 2021/0286183 A1 | 9/2021 | Ouderkirk et al. |
| 2021/0294012 A1 | 9/2021 | Wong et al. |

FOREIGN PATENT DOCUMENTS

| | | |
|---|---|---|
| GB | 2384059 A | 7/2003 |
| WO | WO2007/062098 A2 | 5/2007 |
| WO | 2018146326 A2 | 8/2018 |
| WO | 2018175649 A1 | 9/2018 |
| WO | WO2018/175653 A1 | 9/2018 |
| WO | 2018221867 A1 | 12/2018 |
| WO | 2019104046 A1 | 5/2019 |

OTHER PUBLICATIONS

Facebook Technologies, LLC, international Search Report and Written Opinion, PCT/US2020/033688, dated Oct. 29, 2020, 16 pgs.

Facebook Technologies, LLC, international Search Report and Written Opinion, PCT/US2020/033515, dated Aug. 17, 2020, 11 pgs.

(56) References Cited

OTHER PUBLICATIONS

Geng, Office Action, U.S. Appl. No. 15/930,318, dated Dec. 9, 2020, 9 pgs.
Geng, Office Action, U.S. Appl. No. 16/862,399, dated Dec. 16, 2020, 9 pgs.
Large M J et al., "Parallel Optics in Waveguide Displays: A Flat Panel Autostereoscopic Display," Journal of Display Technology, IEEE Service Center, New York NY, US, vol. 6, No. 10, Oct. 1, 2010 pp. 431-437, XP011311965.
Moller C et al., "Flat Panel Time Multiplexed Autostereoscopic Display Using an Optical WedgeA Waveguide," IDW, 3D2-1, London UK, Jan. 1, 2004, pp. 1443-1446, XP007013996.
Aye T.M., et al., "Compact HMD Optics Based on Multiplexed Aberration-Compensated Holographic Optical Elements," Proceedings of SPIE, Event: Aerospace/Defense Sensing, Simulation, and Controls, Orlando, FL, Aug. 22, 2001, vol. 4361, pp. 88-97.
Ex Parte Quayle Office action mailed Dec. 1, 2020 for U.S. Appl. No. 16/810,417, filed Mar. 5, 2020, 9 pages.
Final Office Action dated Jul. 1, 2022 for U.S. Appl. No. 16/810,458, filed Mar. 5, 2020, 27 pages.
Final Office Action dated Feb. 4, 2022 for U.S. Appl. No. 16/810,458, filed Mar. 5, 2020, 20 pages.
Final Office Action dated Nov. 15, 2021 for U.S. Appl. No. 16/810,431, filed Mar. 5, 2020, 14 pages.
Final Office Action dated Apr. 21, 2022 for U.S. Appl. No. 16/810,471, filed Mar. 5, 2020, 24 pages.
Final Office Action dated Oct. 25, 2021 for U.S. Appl. No. 16/810,494, filed Mar. 5, 2020, 11 pages.
Geng., Final Office Action, dated May 19, 2021 for U.S. Appl. No. 15/930,318, 12 pages.
Geng., Notice of Allowance, dated May 3, 2021, U.S. Appl. No. 16/862,399, 7 pages.
Geng., Notice of Allowance, dated Dec. 14, 2021, U.S. Appl. No. 15/930,318, 11 pages.
Geng., Notice of Allowance, dated Mar. 31, 2021 U.S. Appl. No. 16/862,401, 12 pages.
Geng., Office Action, dated Sep. 3, 2021 U.S. Appl. No. 15/930,318, 13 pages.
International Preliminary Report on Patentability for International Application No. PCT/US2020/046576, dated Mar. 24, 2022, 8 pages.
International Preliminary Report on Patentability for International Application No. PCT/US2020/047281, dated Mar. 24, 2022, 8 pages.
International Preliminary Report on Patentability for International Application No. PCT/US2020/050776, dated Mar. 31, 2022, 18 pages.
International Preliminary Report on Patentability for International Application No. PCT/US2020/050782, dated Mar. 31, 2022, 12 pages.
International Search Report and Written Opinion for International Application No. PCT/US2020/046576, dated Nov. 12, 2020, 9 Pages.
International Search Report and Written Opinion for International Application No. PCT/US2020/047281, dated Nov. 9, 2020, 9 Pages.
International Search Report and Written Opinion for International Application No. PCT/US2020/050776, dated Mar. 15, 2021, 23 Pages.
International Search Report and Written Opinion for International Application No. PCT/US2020/050782, dated Mar. 9, 2021, 16 Pages.
International Search Report and Written Opinion for International Application No. PCT/US2021/013968, dated Jun. 30, 2021, 13 pages.
Invitation to Pay Additional Fees for International Application No. PCT/US2021/013968, dated May 7, 2021, 9 pages.
Larussa J.A., et al., "The Holographic Pancake Window," Proceedings of SPIE 1978, Event: 22nd Annual Technical Symposium, San Diego, 1978, 11 pages.
Margarinos., et al., "Wide Angle, Color, Hologrpahic Infinity Optics Display-Final Report," Farrand Optical Co., Valhalla, NY, Rort No. AFHRL-TR-80-53, Mar. 1981, 93 pages, retrieved from internet: URL: https://files.eric.ed.gov/fulltext/ED202467.pdf.
Moon S., et al., "Layered Display with Accommodation Cue Using Scattering Polarizers," IEEE Journal of Selected Topics in Signal Processing, IEEE, US, Oct. 23, 2017, vol. 11 (7), pp. 1223-1231.
Non-Final Office Action dated Apr. 18, 2022 for U.S. Appl. No. 16/862,396, filed Apr. 29, 2020, 16 pages.
Non-Final Office Action dated Mar. 23, 2022 for U.S. Appl. No. 16/848,652, filed Apr. 14, 2020, 13 pages.
Non-Final Office Action dated Feb. 2, 2022 for U.S. Appl. No. 17/241,921, filed Apr. 27, 2021, 7 pages.
Non-Final Office Action dated Sep. 3, 2021 for U.S. Appl. No. 16/810,471, filed Mar. 5, 2020, 21 pages.
Non-Final Office Action dated Oct. 7, 2021 for U.S. Appl. No. 16/782,604, filed Feb. 5, 2020, 17 Pages.
Non-Final Office Action dated Oct. 7, 2021 for U.S. Appl. No. 16/784,718, filed Feb. 7, 2020, 14 Pages.
Non-Final Office Action dated Feb. 9, 2022 for U.S. Appl. No. 16/532,311, filed Aug. 5, 2019, 10 pages.
Non-Final Office Action dated May 25, 2022 for U.S. Appl. No. 16/862,403, filed Apr. 29, 2020, 29 pages.
Non-Final Office Action dated Oct. 26, 2020 for U.S. Appl. No. 16/810,445, filed Mar. 5, 2020, 11 pages.
Non-Final Office Action dated Apr. 27, 2021 for U.S. Appl. No. 16/810,494, filed Mar. 5, 2020, 11 Pages.
Non-Final Office Action dated Jul. 29, 2021 for U.S. Appl. No. 16/810,431, filed Mar. 5, 2020, 12 Pages.
Non-Final Office Action dated Mar. 30, 2022 for U.S. Appl. No. 16/734,163, filed Jan. 3, 2020, 14 pages.
Notice of Allowance dated Feb. 8, 2022 for U.S. Appl. No. 16/782,604, filed Feb. 5, 2020, 9 pages.
Notice of Allowance dated Feb. 8, 2022 for U.S. Appl. No. 16/784,718, filed Feb. 7, 2020, 9 pages.
Notice of Allowance dated Feb. 9, 2022 for U.S. Appl. No. 16/799,607, filed Feb. 24, 2020, 3 pages.
Notice of Allowance dated Jun. 1, 2022 for U.S. Appl. No. 16/810,494, filed Mar. 5, 2020, 5 pages.
Notice of Allowance dated Mar. 11, 2022 for U.S. Appl. No. 16/799,607, filed Feb. 24, 2020, 21 pages.
Notice of Allowance dated Jan. 12, 2021 for U.S. Appl. No. 16/810,417, filed Mar. 5, 2020, 6 pages.
Notice of Allowance dated May 12, 2022 for U.S. Appl. No. 17/241,921, filed Apr. 27, 2021, 7 pages.
Notice of Allowance dated May 13, 2022 for U.S. Appl. No. 16/799,607, filed Feb. 24, 2020, 3 pages.
Notice of Allowance dated Apr. 15, 2022 for U.S. Appl. No. 16/810,431, filed Mar. 5, 2020, 10 pages.
Notice of Allowance dated Mar. 19, 2021 for U.S. Appl. No. 16/810,485, filed Mar. 5, 2020, 12 pages.
Notice of Allowance dated Jun. 20, 2022 for U.S. Appl. No. 16/532,311, filed Aug. 5, 2019, 8 pages.
Notice of Allowance dated Jan. 21, 2022 for U.S. Appl. No. 16/799,607, filed Feb. 24, 2020, 10 pages.
Notice of Allowance dated Aug. 23, 2022 for U.S. Appl. No. 17/241,921, filed Apr. 27, 2021, 2 pages.
Notice of Allowance dated Jun. 23, 2022 for U.S. Appl. No. 16/799,607, filed Feb. 24, 2020, 3 pages.
Notice of Allowance dated May 24, 2022 for U.S. Appl. No. 16/734,167, filed Jan. 3, 2020, 8 pages.
Notice of Allowance dated Apr. 26, 2022 for U.S. Appl. No. 16/810,431, filed Mar. 5, 2020, 04 pages.
Notice of Allowance dated Jan. 27, 2021 for U.S. Appl. No. 16/810,445, filed Mar. 5, 2020, 9 pages.
Notice of Allowance dated Feb. 28, 2022 for U.S. Appl. No. 16/810,494, filed Mar. 5, 2020, 5 pages.
Notice of Allowance dated Jul. 28, 2022 for U.S. Appl. No. 16/734,167, filed Jan. 3, 2020, 2 pages.
Notice of Allowance dated Mar. 29, 2022 for U.S. Appl. No. 16/810,494, filed Mar. 5, 2020, 5 pages.
Notice of Allowance dated Jan. 31, 2022 for U.S. Appl. No. 16/810,494, filed Mar. 5, 2020, 8 pages.

(56) References Cited

OTHER PUBLICATIONS

Non-Final Office Action dated Oct. 24, 2022 for U.S. Appl. No. 16/810,458, filed Mar. 5, 2020, 26 pages.
Notice of Allowance dated Feb. 1, 2023 for U.S. Appl. No. 16/734,163, filed Jan. 3, 2020, 2 pages.
Notice of Allowance dated Jan. 19, 2023 for U.S. Appl. No. 16/848,652, filed Apr. 14, 2020, 2 pages.
Notice of Allowance dated Oct. 20, 2022 for U.S. Appl. No. 16/532,311, filed Aug. 5, 2019, 8 pages.
Notice of Allowance dated Oct. 20, 2022 for U.S. Appl. No. 16/734,163, filed Jan. 3, 2020, 11 pages.
Notice of Allowance dated Jan. 26, 2023 for U.S. Appl. No. 16/532,311, filed Aug. 5, 2019, 2 pages.
Notice of Allowance dated Sep. 29, 2022 for U.S. Appl. No. 16/848,652, filed Apr. 14, 2020, 8 pages.

\* cited by examiner

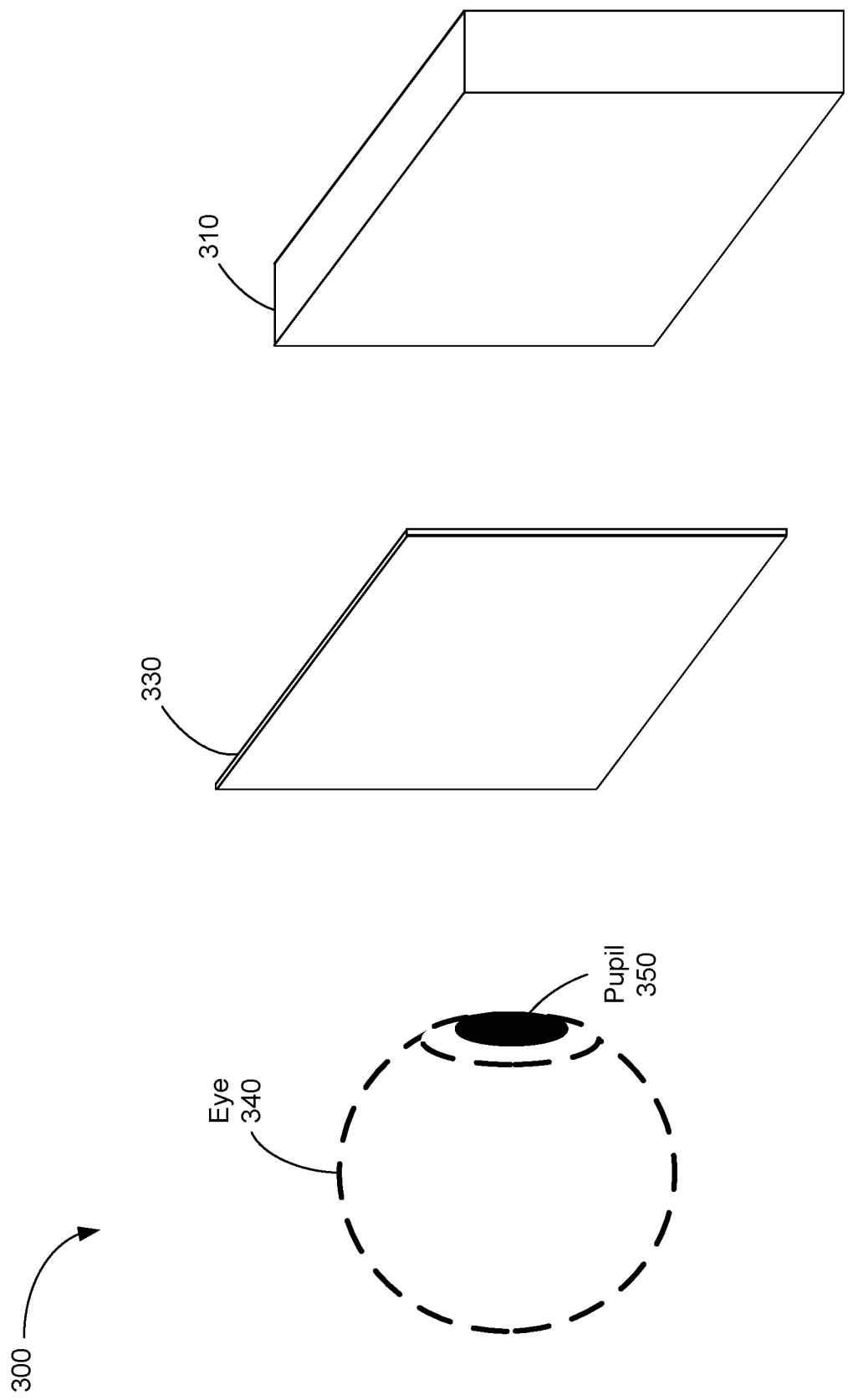

890 Receive the second portion of the second light at a second switchable cell. Transmit, through the second switchable cell, the second portion of the second light as third light while changing the polarization of the second portion of the second light such that the third light has a polarization that is different from the second polarization. Output, from the second switchable cell, the third light toward a third optical element. Receive the third light at the third optical element. Redirect, by the third optical element, a first portion of the third light having the first polarization. Transmit, by the third optical element, a second portion of the third light having the second polarization.

892 Redirected the first portion of the third light toward the reflective spatial light modulator. Receive the first portion of the third light at a third group of pixels of the reflective spatial light modulator. Absorb the first portion of the third light at the third group of pixels.

Figure 8C

ACTIVE ZONAL DISPLAY ILLUMINATION USING A CHOPPED LIGHTGUIDE

RELATED APPLICATIONS

This application claims the benefit of, and priority to, U.S. Provisional Patent Application Ser. No. 62/898,453, filed Sep. 10, 2019, which is incorporated by reference herein in its entirety. This application is related to U.S. patent application Ser. No. 16/799,607 entitled "Display Illumination Using a Grating" filed Feb. 24, 2020, U.S. patent application Ser. No. 16/734,163 entitled "Switchable Polarization Retarder Array for Active Zonal Illumination of Display" filed Jan. 3, 2020, and U.S. patent application Ser. No. 16/734,167 entitled "Display With Switchable Retarder Array" filed Jan. 3, 2020, each of which is hereby incorporated by reference in its entirety.

TECHNICAL FIELD

This relates generally to display devices, and more specifically to illuminators for use in head-mounted display devices.

BACKGROUND

Head-mounted display devices (also called herein head-mounted displays) are gaining popularity as means for providing visual information to a user. For example, the head-mounted display devices are used for virtual reality and augmented reality operations.

Light, compact, and energy-efficient displays are desired in head-mounted display devices in order to improve user experience with virtual reality and augmented reality operations. Additionally, uniform illumination light is desired in order to provide users with high quality images.

SUMMARY

Accordingly, there is a need for compact and lightweight head-mounted display devices with high quality images. Such head-mounted display devices enhance user experience with virtual reality and/or augmented reality operations.

The above deficiencies and other problems associated with conventional head-mounted displays are reduced or eliminated by the disclosed optical components and display devices.

In addition, instead of illuminating an entire surface of a display element (e.g., a display screen), illuminating one or more portions (or zones) of the display element reduces power consumption, which improves the operational time and the duration between battery charges. Furthermore, the reduced power consumption allows use of a smaller and lighter battery, which further reduces the size and weight of the head-mounted display device.

In accordance with some embodiments, an optical device includes a substrate and a plurality of optical elements positioned on the substrate. A respective optical element of the plurality of optical elements is configured to redirect light having a first polarization and transmit light having a second polarization orthogonal to the first polarization. The plurality of optical elements includes a first optical element located on a first region of the substrate, and a second optical element located on a second region of the substrate. The optical device also includes one or more switchable cells. A respective switchable cell of the one or more switchable cells includes optically anisotropic molecules (e.g., liquid crystals). In some embodiments, the optically anisotropic molecules are configurable to control a polarization of transmitted light. The one or more switchable cells include a first switchable cell located on a first cell location of the substrate between the first region and the second region of the substrate.

In accordance with some embodiments, a display device includes a light source and a reflective spatial light modulator. The light source is configured to output illumination light. The reflective spatial light modulator is configured to receive at least a portion of the illumination light and output modulated light. The display device also includes an optical device positioned to receive the illumination light, output at least a portion of the illumination light toward the reflective spatial light modulator, receive modulated light output from the reflective spatial light modulator, and transmit the modulated light output from the reflective spatial light modulator.

In accordance with some embodiments, a method includes receiving first light at a first optical element; redirecting, by the first optical element, a first portion of the first light having the first polarization; and transmitting, through the first optical element, a second portion of the first light having the second polarization toward a first switchable cell. The method also includes transmitting, through the first switchable cell, the second portion of the first light as second light while changing the polarization of the second portion of the first light so that the second light has a polarization that is different from the second polarization; and outputting, from the first switchable cell, the second light toward a second optical element. The method further includes receiving, by the second optical element, the second light; redirecting, by the second optical element, a first portion of the second light having the first polarization; and transmitting, by the second optical element, a second portion of the second light having the second polarization.

Thus, the disclosed embodiments provide lightweight and compact display devices that provide high quality images. In some embodiments, the display devices are head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 8A-8C are flow diagrams illustrating a method of providing active zonal illumination in accordance with some embodiments.

These figures are not drawn to scale unless indicated otherwise.

DETAILED DESCRIPTION

There is a need for head-mounted display devices that are lightweight, compact, and can provide uniform illumination.

The present disclosure provides display devices that produce uniform illumination in a compact footprint. The display device includes an optical device that is configured to direct illumination light emitted from a light source toward a reflective spatial light modulator and transmit light output from the reflective spatial light modulator so that the output light can form images at a user's eyes.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first reflector could be termed a second reflector, and, similarly, a second reflector could be termed a first reflector, without departing from the scope of the various described embodiments. The first reflector and the second reflector are both light reflectors, but they are not the same reflector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
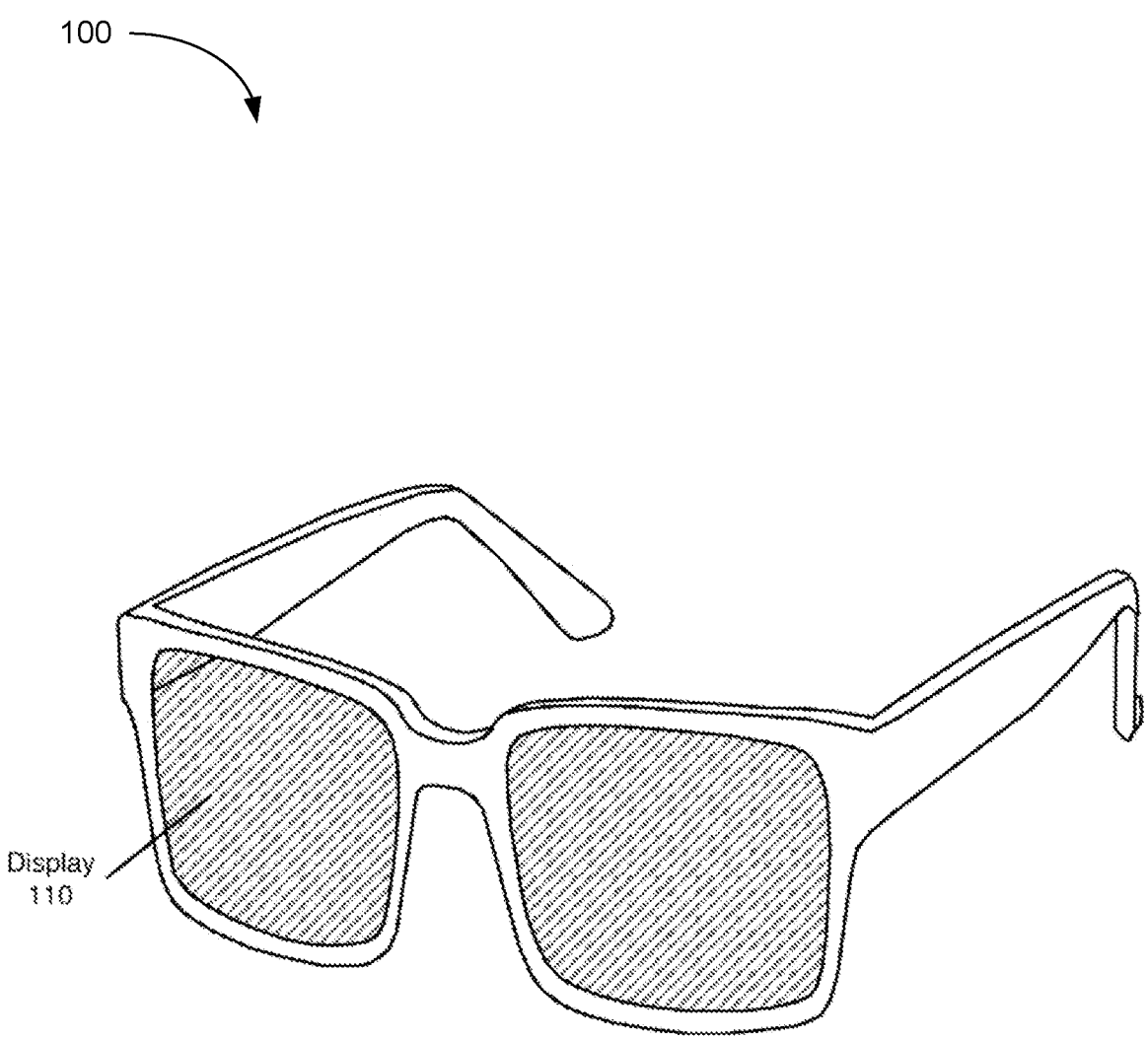
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
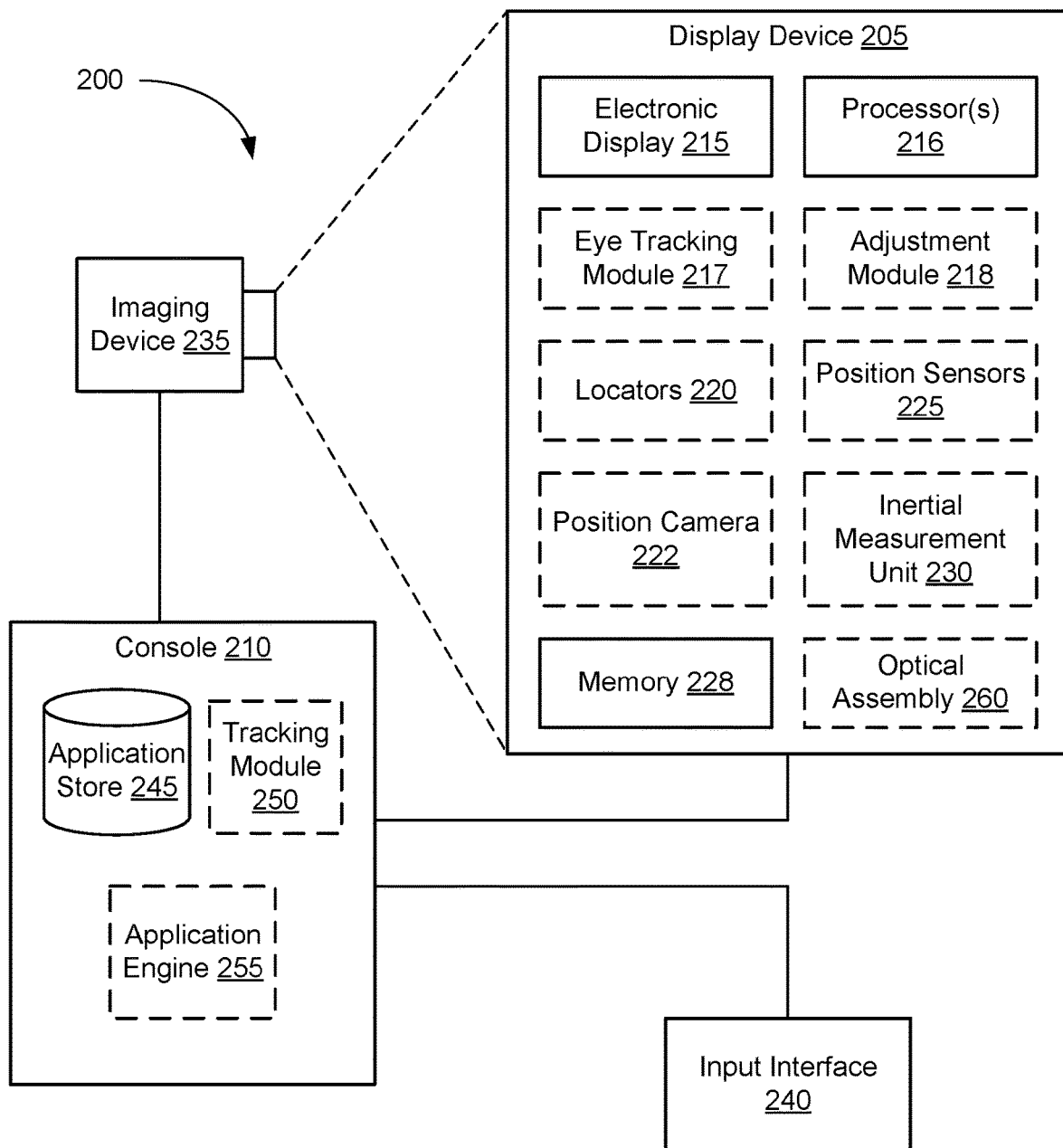
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 corresponds to display device 100 and is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox and ultimately to the back of the user's retina(s). An eyebox is a region that is occupied by an eye of a user of display device 205 (e.g., a user wearing display device 205) who is viewing images from display device 205. In some cases, the eyebox is represented as a 10 mm×10 mm square. In some embodiments, the one or more optical components include one or more coatings, such as anti-reflective coatings, and one or more polarization volume holograms (PVH).

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Additionally or alternatively, the reflection off of the surfaces of the eye is used to also determine location of the pupil. In some cases, the IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps the received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR eye tracking system described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to provide image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260. In some embodiments, display device 205 optionally includes a single optical assembly 260 or multiple optical assemblies 260 (e.g., an optical assembly 260 for each eye of a user). In some embodiments, the one or more optical assemblies 260 receive image light for the computer generated images from the electronic display device(s) 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display device 215 projects computer-generated images to one or more reflective elements (not shown), and the one or more optical assemblies receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device 310. In some embodiments, the IR detector array is integrated into light emission device 310.

In some embodiments, light emission device 310 including an emission intensity array make up a display element. Alternatively, the display element includes light emission device 310 (e.g., when light emission device 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device 310 of display device 300) includes a reflective spatial light modulator, such as a Liquid Crystal on Silicon (LCoS) spatial light modulator. In some embodiments, the LCoS spatial light modulator includes liquid crystals. In some embodiments, the LCoS spatial light modulator includes ferroelectric liquid crystals. The reflective spatial light modulator has an array of pixels (or subpixels), and a respective pixel (or a respective subpixel) is individually controlled to reflect light impinging thereon (e.g., a pixel is activated to reflect light impinging thereon or deactivated to cease reflecting the light impinging thereon) or modulate the reflected light (e.g., a pixel is activated to change the polarization of the reflected light or deactivated to cease changing the polarization of the reflected light, or vice versa). In some embodiments, display device 300 includes multiple reflective spatial light modulators (e.g., a first reflective spatial light modulator for a first color, such as red, a second reflective spatial light modulator for a second color, such as green, and a third reflective spatial light modulator for a third color, such as blue). Such reflective spatial light modulator requires an illuminator that provides light to the reflective spatial light modulator.

Conventional illuminators (e.g., conventional LCoS illuminators) use a single polarizing beam splitter (PBS), which has a height that corresponds to a width of the reflective spatial light modulator (e.g., an LCoS spatial light modulator), for illuminating the LCoS spatial light modulators. This increases the required volume of the illuminator. In addition, as the LCoS spatial light modulator typically reflects a portion of illumination light to provide image light, non-uniformity in the illumination light will lead to non-uniformity in the image light. Thus, there is a need for compact illuminators that can provide uniform illumination of LCoS spatial light modulators.

FIGS. 4A-4F, 5A-5C, 6A-6C, and 7A-7B illustrate example optical devices and display devices that enable compact illumination in accordance with some embodiments. The optical devices and display devices further improve uniformity in illumination light. Such optical devices may be used to illuminate a reflective spatial light modulator, such as an LCoS spatial light modulator. In some embodiments, such optical devices include the reflective spatial light modulator (e.g., the reflective spatial light modulator is integrated into the optical device). In addition, the optical devices and display devices allow conditionally illuminating a subset, less than all, of an entire surface of the spatial light modulator, thereby enabling zonal illumination of the spatial light modulator.

Figure 4A:
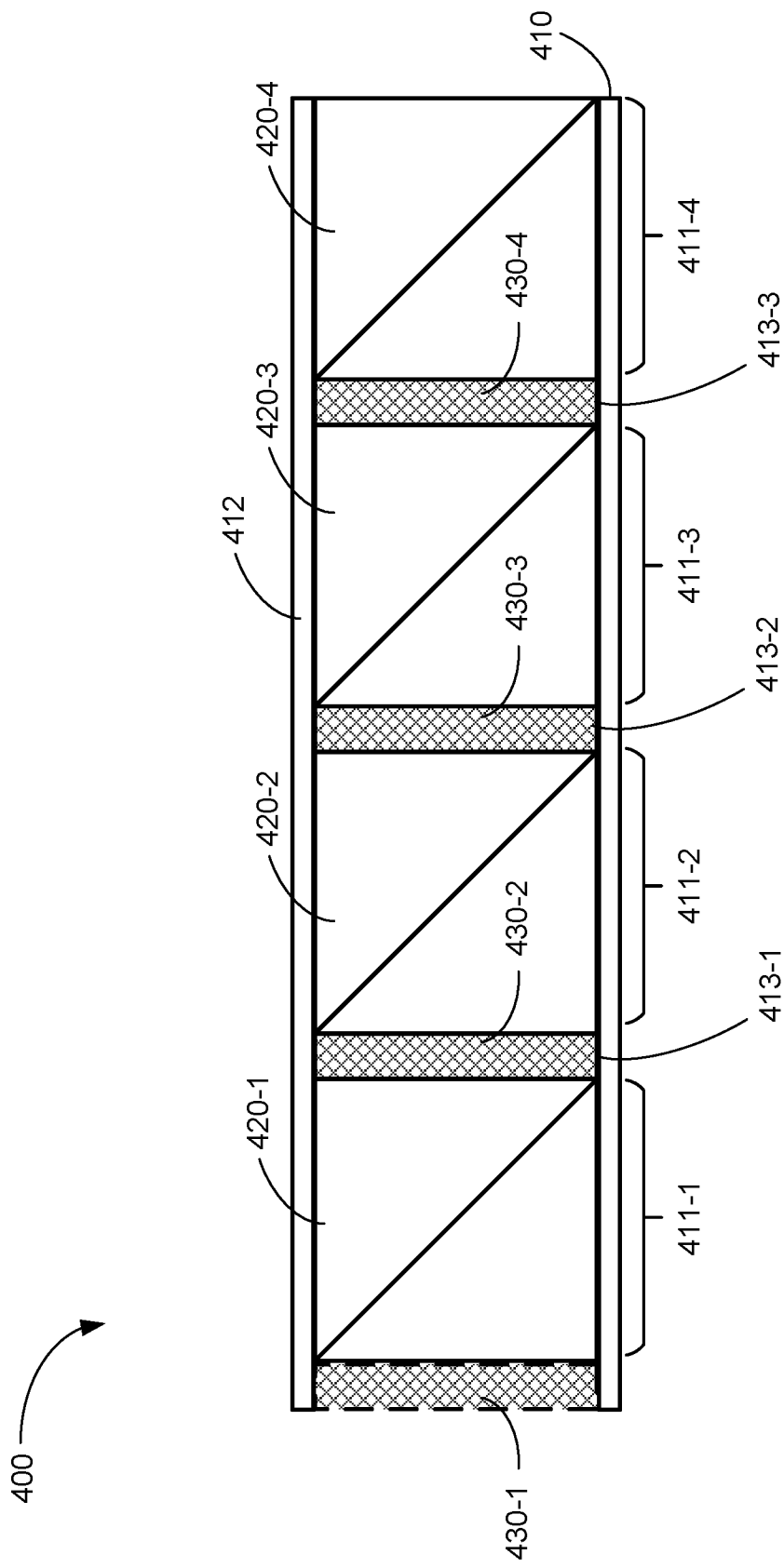
FIG. 4A is a schematic diagram illustrating an optical device in accordance with some embodiments.

FIG. 4A is a schematic diagram illustrating an optical device 400 in accordance with some embodiments. Optical device 400 includes substrates 410 and 412, a plurality of optical elements 420 (e.g., optical elements 420-1 through 420-4) and one or more switchable cells 430 (e.g., switchable cells 430-1 through 430-4). The plurality of optical elements 420 and the one or more switchable cells 430 are disposed on substrate 410. In some embodiments, as shown, the plurality of optical elements 420 and the one or more switchable cells 430 are disposed between the substrates 410 and 412. The plurality of optical elements 420 includes a first optical element 420-1 that is disposed on a first region 411-1 of substrate 410 and a second optical element 420-2 that is disposed on a second region 411-2 of substrate 410. The one or more switchable cells include a first switchable cell 430-2 located on a first cell location 413-1 of the substrate 410 that is between the first region 411-1 and the second region 411-2 of the substrate 410. Third and fourth optical elements 420-3 and 420-4 of the plurality of optical elements 420 are also shown in FIG. 4A (e.g., the third optical element 420-3 is disposed on a third region 411-3 of substrate 410 and the fourth optical element 420-4 is disposed on a fourth region 411-4 of substrate 410). Second and third switchable cells 430-3 and 430-4 of the one or more switchable cells 430 are also shown in FIG. 4A (e.g., the second switchable cell 430-3 is located on a second cell location 413-2 of the substrate 410 that is between the second region 411-2 and the third region 411-3 of the substrate 410 and the third switchable cell 430-4 is located on a third cell location 413-3 of the substrate 410 that is between the third region 411-3 and the fourth region 411-4 of the substrate 410).

In some embodiments, as shown in FIG. 4A, the one or more switchable cells 430 also include an initial switchable cell 430-1. In FIG. 4A, the initial switchable cell 430-1 and the first switchable cell 430-2 are located on opposite sides of the first optical element 420-1 (e.g., the first optical element 420-1 is disposed between the initial switchable cell 430-1 and the first switchable cell 430-2).

A respective optical element of the plurality of optical elements 420 is configured to redirect light having a first polarization and transmit light having a second polarization that is orthogonal to the first polarization.

Figure 4B:
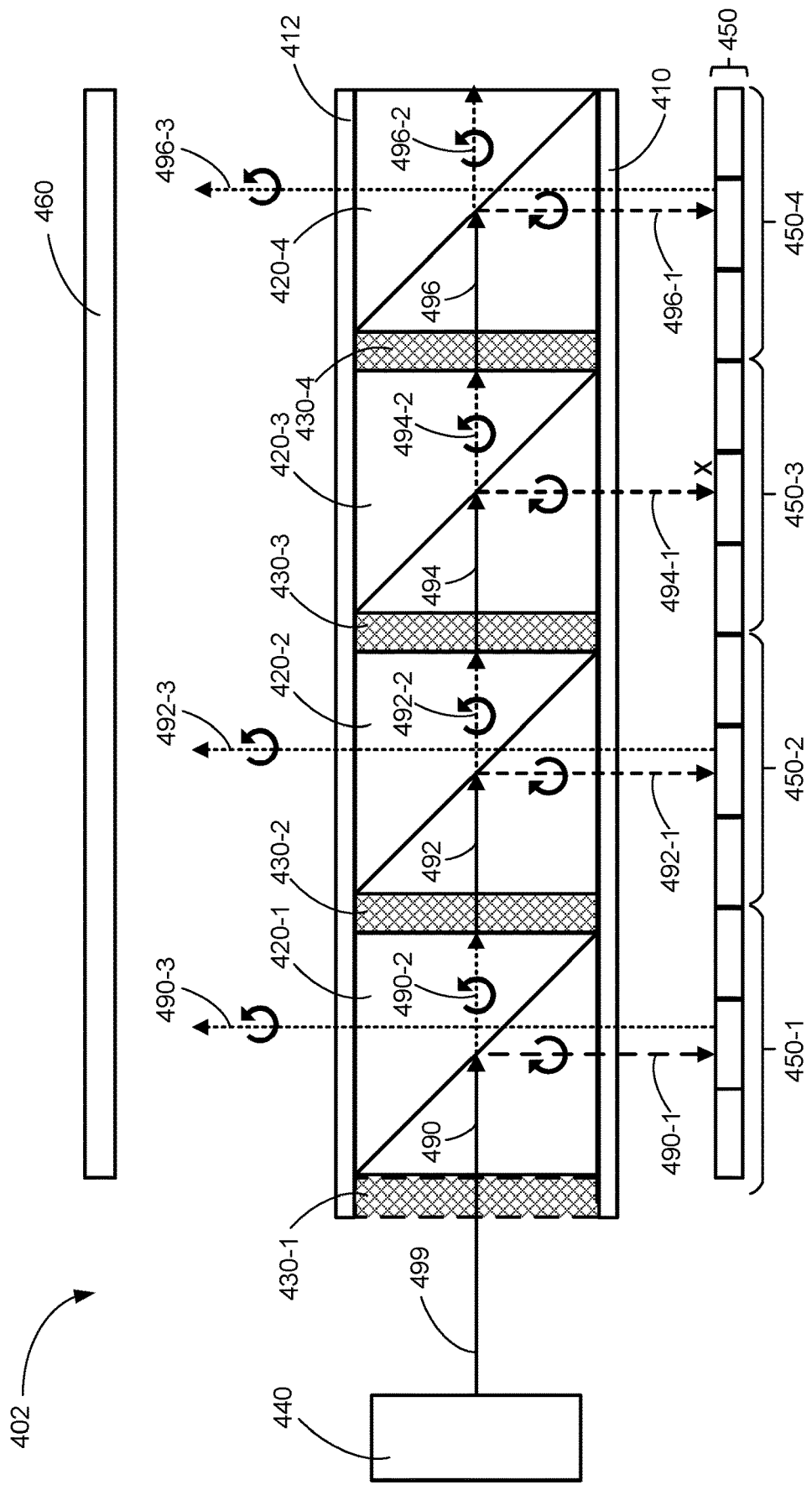
FIG. 4B is a schematic diagram illustrating a display device in accordance with some embodiments.
Figure 4C:
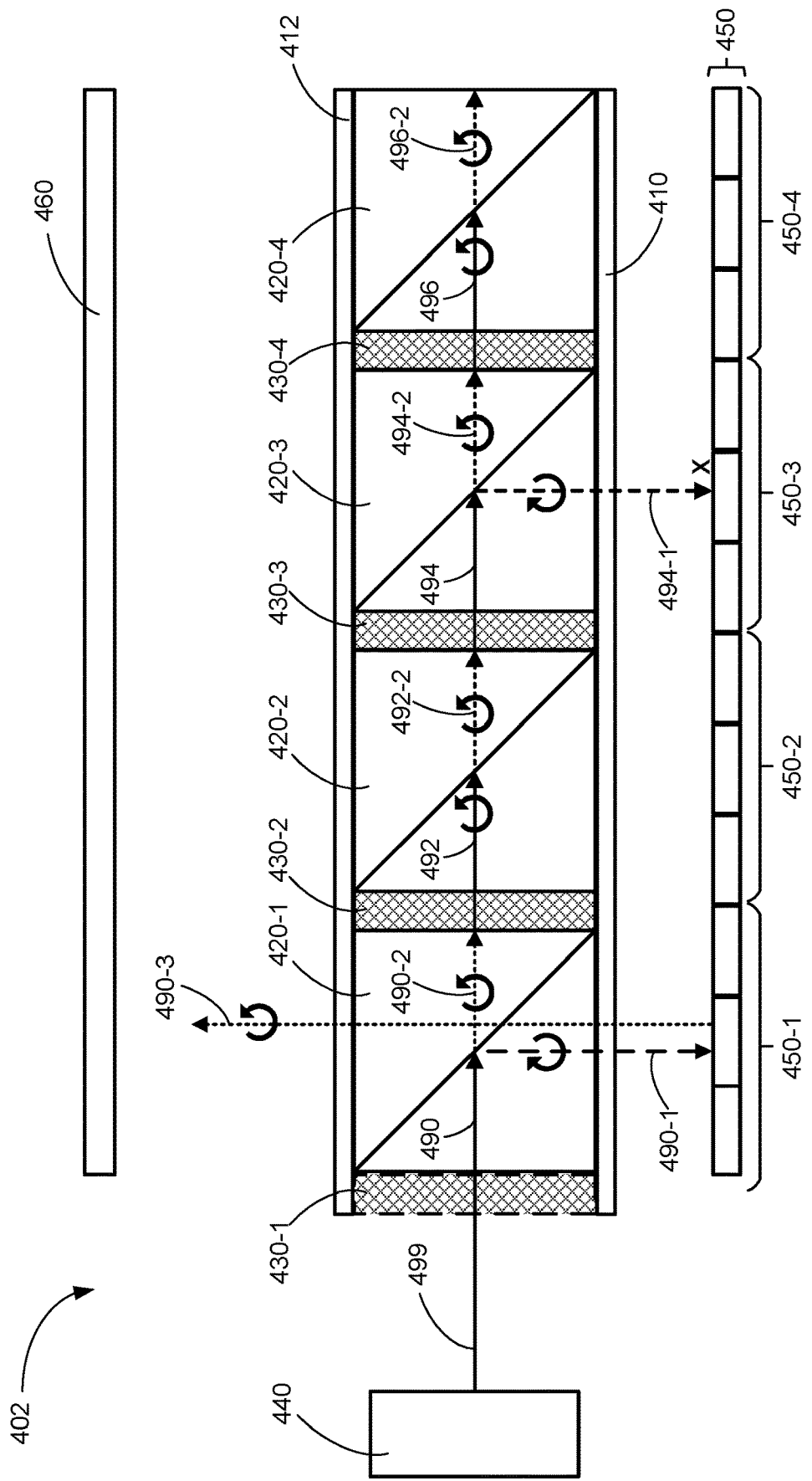
FIG. 4C is a schematic diagram illustrating a display device in accordance with some embodiments.
Figure 4D:
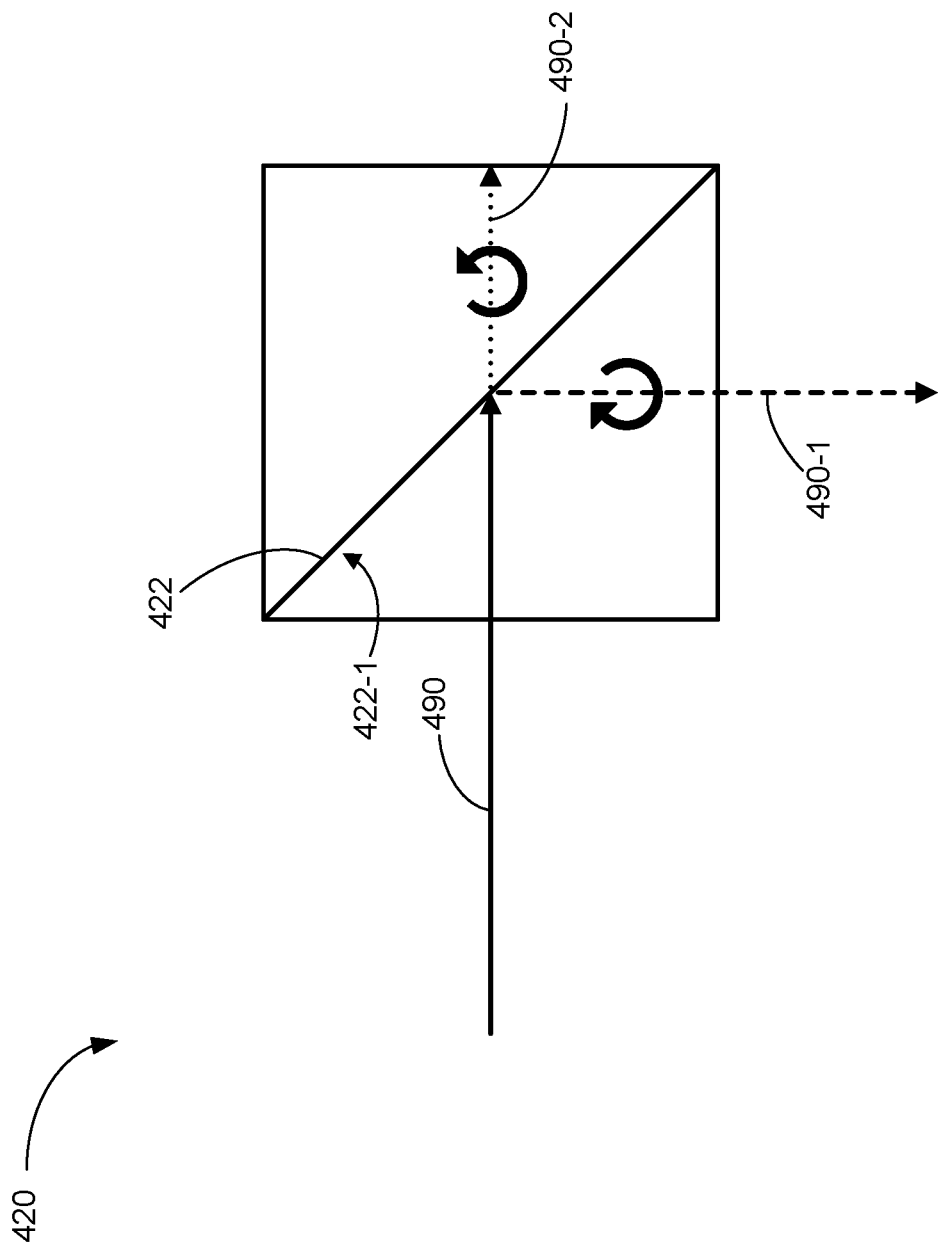
FIG. 4D is a schematic diagram illustrating optical paths in the optical element shown in FIGS. 4A and 4B in accordance with some embodiments.
Figure 4E:
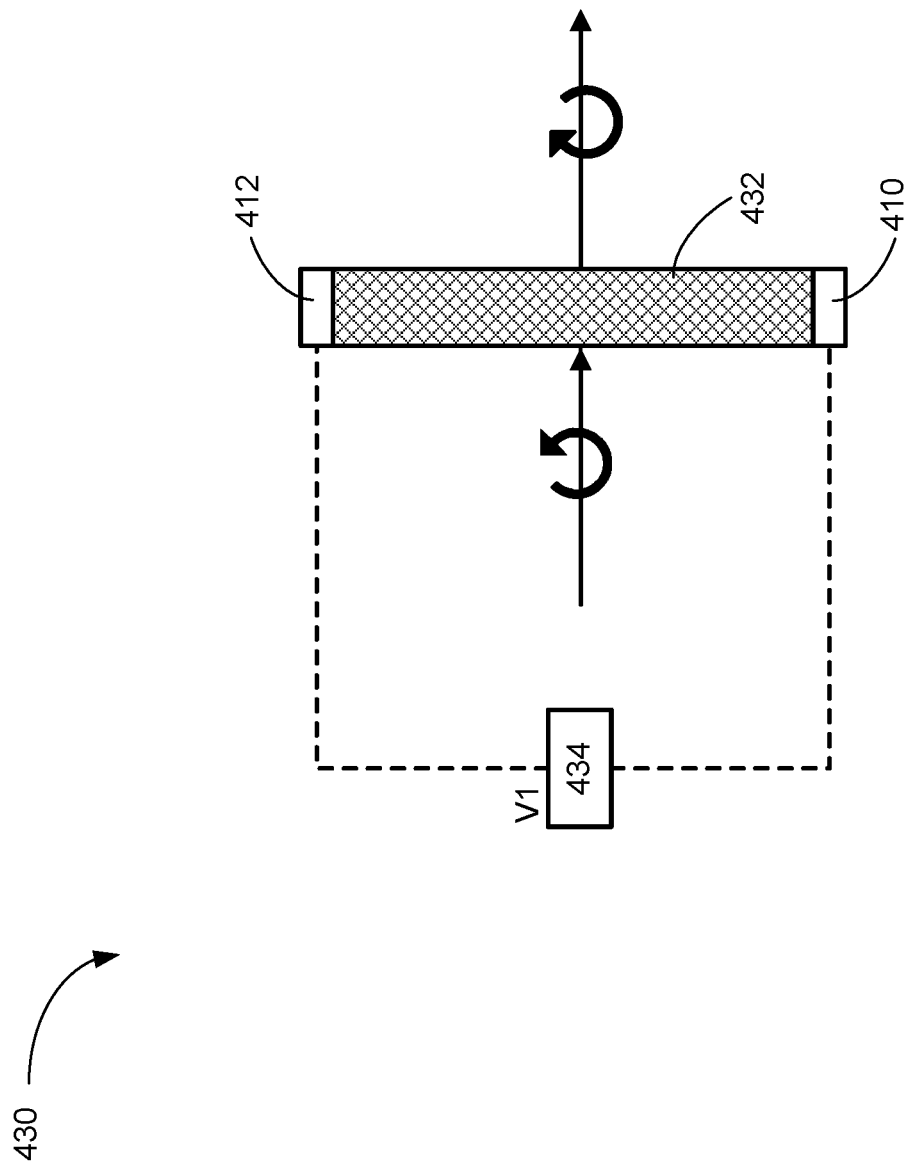
FIGS. 4E-4F are schematic diagrams illustrating operations of a switchable cell in accordance with some embodiments.
Figure 4F:
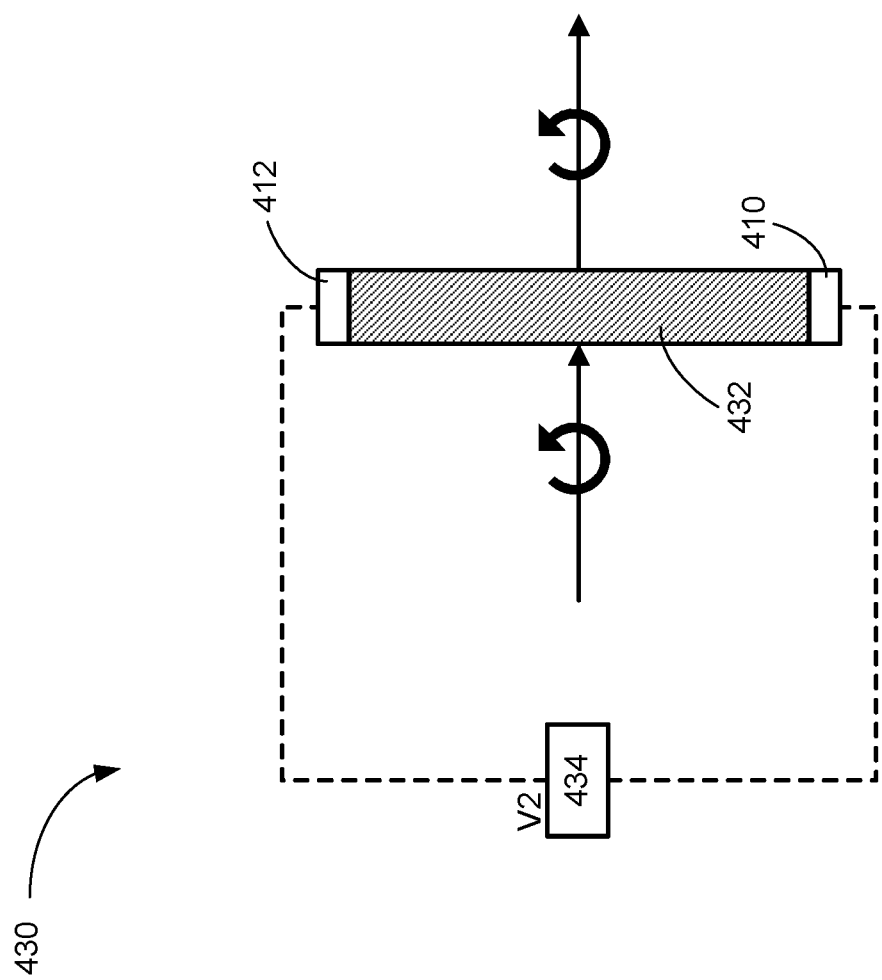

In some embodiments, a respective switchable cell of the one or more switchable cells 430 includes optically anisotropic molecules (e.g., liquid crystals) that are configurable to control (or change or modulate) a polarization of transmitted light, as shown in FIGS. 4E and 4F.

FIG. 4B is a schematic diagram illustrating a display device 402 in accordance with some embodiments. The display device 402 includes the optical device 400 shown in FIG. 4A.

The first optical element 420-1 of the plurality of optical elements 420 is configured (e.g., positioned) to receive first light 490. In some embodiments, the first light 490 is output from a light source 440 (or is based on light output from the light source 440). The first optical element 420-1 is also configured to redirect a first portion 490-1 of the first light 490 having the first polarization (e.g., left-handed circular polarization (LCP)) and to transmit a second portion 490-2 of the first light 490 having the second polarization (e.g., right-handed circular polarization (RCP)) toward a first switchable cell 430-2 of the one or more switchable cells 430.

The first switchable cell 430-2 is configured (e.g., positioned) to transmit the second portion 490-2 of the first light 490 as second light 492 while conditionally changing the polarization of the second portion 490-2 of the first light 490 so that the second light 492 has a polarization that may be different from the second polarization. For example, in some embodiments, while the first switchable cell 430-2 is in a first state (e.g., an "off" state), the first switchable cell 430-2 does not change the polarization of the transmitted light so that the second light 492 has the same polarization as the second portion 490-2 of the first light 490, and while the first switchable cell 430-2 is in a second state (e.g., an "on" state) that is different from the first state, the first switchable cell 430-2 changes the polarization of the transmitted light so that the second light 492 has a polarization that is different from the polarization of the second portion 490-2 of the first light 490. Alternatively, in some other embodiments, while the first switchable cell 430-2 is in the first state, the first switchable cell 430-2 changes the polarization of the transmitted light so that the second light 492 has a polarization that is different from the polarization of the second portion 490-2 of the first light 490, and while the first switchable cell 430-2 is in the second state, the first switchable cell 430-2 does not change the polarization of the transmitted light so that the second light 492 has the same polarization as the second portion 490-2 of the first light 490. The second light 492 is output from the first switchable cell 430-2 toward the second optical element 420-2 of the plurality of optical elements 420.

The second optical element 420-2 of the plurality of optical elements 420 is configured (e.g., positioned) to receive the second light 492, redirect a first portion 492-1 of the second light 492 having the first polarization, and transmit a second portion 492-2 of the second light 492 having the second polarization toward a second switchable cell 430-3.

The second switchable cell 430-3 is configured (e.g., positioned) to transmit the second portion 492-2 of the second light 490 as third light 494 while conditionally changing the polarization of the second portion 492-2 of the second light 492 so that the third light 494 may have a polarization that is different from the second polarization. For example, in some embodiments, while the second switchable cell 430-3 is in a first state (e.g., an "off" state), the second switchable cell 430-3 does not change the polarization of the transmitted light so that the third light 494 has the same polarization as the second portion 492-2 of the second light 492, and while the second switchable cell 430-3 is in a second state (e.g., an "on" state) that is different from the first state, the second switchable cell 430-3 changes the polarization of the transmitted light so that the third light 494 has a polarization that is different from the polarization of the second portion 492-2 of the second light 492. Alternatively, in some other embodiments, while the second switchable cell 430-3 is in the first state, the second switchable cell 430-3 changes the polarization of the transmitted light so that the third light 494 has a polarization that is different from the polarization of the second portion 492-2 of the second light 492, and while the second switchable cell 430-3 is in the second state, the second switchable cell 430-3 does not change the polarization of the transmitted light so that the third light 494 has the same polarization as the second portion 492-2 of the second light 492. The third light 494 is output from the second switchable cell 430-3 toward the third optical element 420-3 of the plurality of optical elements 420.

The third optical element 420-3 of the plurality of optical elements 420 is configured (e.g., positioned) to receive the third light 494, redirect a first portion 494-1 of the third light 494 having the first polarization, and transmit a second portion 494-2 of the third light 494 having the second polarization.

In some embodiments, the second polarization is orthogonal to the first polarization. In some embodiments, as shown in FIG. 4B, the first polarization and the second polarization are circular polarizations (e.g., the first polarization is LCP and the second polarization is RCP; alternatively, the first polarization is RCP and the second polarization is LCP). Alternatively, the first polarization and the second polarization may be linear polarizations.

In some embodiments, the display device 402 also includes the third switchable cell 430-4 and the fourth optical element 420-4. The third switchable cell 430-4 is positioned to receive the second portion 494-2 of the third light 494 from the third optical element 420-3.

The third switchable cell 430-4, when included in the display device 402, is configured (e.g., positioned) to transmit the second portion 494-2 of the third light 494 as fourth light 496 while conditionally changing the polarization of the second portion 494-2 of the third light 494 so that the fourth light 496 may have a polarization that is different from the second polarization. For example, in some embodiments, while the third switchable cell 430-4 is in a first state (e.g., an "off" state), the third switchable cell 430-4 does not change the polarization of the transmitted light so that the fourth light 496 has the same polarization as the second portion 494-2 of the third light 494, and while the third switchable cell 430-4 is in a second state (e.g., an "on" state) that is different from the first state, the third switchable cell 430-4 changes the polarization of the transmitted light so that the fourth light 496 has a polarization that is different from the polarization of the second portion 494-2 of the third light 494. Alternatively, in some other embodiments, while the third switchable cell 430-4 is in the first state, the third switchable cell 430-4 changes the polarization of the transmitted light so that the fourth light 496 has a polarization that is different from the polarization of the second portion 494-2 of the third light 494, and while the third switchable cell 430-4 is in the second state, the third switchable cell 430-4 does not change the polarization of the transmitted light so that the fourth light 496 has the same polarization as the second portion 494-2 of the third light 494. The fourth light 496 is output from the third switchable cell 430-4 toward the fourth optical element 420-4 of the plurality of optical elements 420.

The fourth optical element 420-4 of the plurality of optical elements 420, when included in the display device 402, is configured (e.g., positioned) to receive the fourth light 496, redirect a first portion 496-1 of the fourth light 496 having the first polarization, and transmit a second portion 496-2 of the fourth light 496 having the second polarization.

In some embodiments, as shown in FIG. 4B, the one or more switchable cells 430 include the initial switchable cell 430-1 disposed on the substrate 410 so that the first optical element 420-1 is located between the initial switchable cell 430-1 and the first switchable cell 430-2. In some embodiments, the initial switchable cell 430-1 is disposed between the light source 440 and the first optical element 420-1. The initial switchable cell 430-1 is configured (e.g., positioned) to receive the illumination light 499 and transmit the illumination light 499 as the first light 490. In some embodiments, the initial switchable cell 430-1 conditionally changes the polarization of the first light 490. For example, in some embodiments, while the initial switchable cell 430-1 is in a first state (e.g., an "off" state), the initial switchable cell 430-1 does not change the polarization of the transmitted light so that the first light 490 has the same polarization as the illumination light 499, and while the initial switchable cell 430-1 is in a second state (e.g., an "on" state) that is different from the first state, the initial switchable cell 430-1 changes the polarization of the transmitted light so that the first light 490 has a polarization that is different from the polarization of the illumination light 499. Alternatively, in some other embodiments, while the initial switchable cell 430-1 is in the first state, the initial switchable cell 430-1 changes the polarization of the transmitted light so that the first light 490 has a polarization that is different from the polarization of the illumination light 499, and while the initial switchable cell 430-1 is in the second state, the initial switchable cell 430-1 does not change the polarization of the transmitted light so that the first light 490 has the same polarization as the illumination light 499.

In some embodiments, the display device 402 includes additional optical elements 420 and/or additional switchable cells. In some embodiments, the display device 402 includes fewer optical elements 420 and/or fewer switchable cells. For brevity, such details are omitted herein.

In some embodiments, the display device 402 also includes a reflective spatial light modulator 450 (e.g., an LCoS spatial light modulator) that is located on an opposite side of substrate 410 from the plurality of optical elements 420 and the one or more switchable cells 430. The reflective spatial light modulator 450 includes a plurality of pixels. A respective pixel of the plurality of pixels is configured to receive a respective portion of the illumination light 499 that have been redirected by respective optical elements of the plurality of optical elements 420. For example, as shown in FIG. 4B, a first group of pixels 450-1 of the plurality of pixels receives the first portion 490-1 of the first light 490 redirected by the first optical element 420-1, a second group of pixels 450-2 of the plurality of pixels receives the first portion 492-1 of the second light 492 redirected by the second optical element 420-2, a third group of pixels 450-3 of the plurality of pixels receives the first portion 494-1 of the third light 494 redirected by the third optical element 420-3, and a fourth group of pixels 450-4 of the plurality of pixels receives the first portion 496-1 of the fourth light 496 redirected by the fourth optical element 420-4. A plurality of pixels in the reflective spatial light modulator 450 is configured to output modulated light having the second polarization (e.g., RCP). For example, as shown in FIG. 4B, a pixel in the first group of pixels 450-1 outputs a third portion 490-3 of the first light 490 by reflecting at least a portion of the first portion 490-1 of the first light. In contrast, a pixel of the third group of pixels 450-3 does not output light (e.g., absorbs a corresponding portion of the first portion 494-1 of the third light 494). A respective optical element of the plurality of optical elements 420 is further configured to receive the modulated light (e.g., light 490-3, 492-3, and 496-3) output from the reflective spatial light modulator 450 and to transmit the modulated light having the second polarization toward an output assembly 460. In some embodiments, as shown in FIG. 4B, the modulated light is transmitted through respective optical element(s) 420 without a change in polarization (and in some cases, without a change in the direction of the modulated light).

In some embodiments, the output assembly 460 includes a waveguide and an in-coupler (e.g., an input coupler) so that at least a portion of the modulated light (e.g., light 490-3 and 492-3, 496-3) is coupled into the waveguide.

In some embodiments, outputting the modulated light includes reflecting, at a first pixel of the plurality of pixels, at least a portion of the light redirected by a respective optical element 420 toward the reflective spatial light modulator 450 and absorbing, at a second pixel of the plurality of pixels, at least a portion of the light redirected by a respective optical element 420 toward the reflective spatial light modulator 450. In some embodiments, a respective pixel of the plurality of pixels is individually activatable. For example, the respective pixel of the plurality of pixels may be activated or deactivated independent of whether the rest of the plurality of pixels are activated or deactivated. Since a respective pixel of the plurality of pixels is individually activatable, a first pixel may be configured in a first state to reflect light and a second pixel may be configured in a second state to absorb light.

In some embodiments, a respective optical element 420 of the plurality of optical elements 420 is configured to illuminate a corresponding group of pixels. For example, the first optical element 420-1 is configured to illuminate a first group of pixels 450-1, the second optical element 420-2 is configured to illuminate a second group of pixels 450-2, and the third optical element 420-3 is configured to illuminate a third group of pixels 450-3. Thus, by controlling the polarization of light passing through respective switchable cells of the one or more switchable cells 430, optical device 400 can selectively illuminate one or more portions of the reflective spatial light modulator 450. As a result, optical device 400 can illuminate a subset of pixels, less than all, of the plurality of pixels in the reflective spatial light modulator 450.

In some embodiments, the reflective spatial light modulator 450 includes a reflective surface, an absorptive polarizer, and a layer of optically anisotropic molecules (e.g., liquid crystals). In some embodiments, the reflective spatial light modulator 450 may also include an optical retarder, such as a quarter wave plate. In such cases, the layer of optically anisotropic molecules is disposed between the reflective surface and the optical retarder. This configuration allows intensity modulation so that the respective pixel of the plurality of pixels may, (i) while the respective pixel is in the first state, provide the modulated light having a polarization that is orthogonal to the light redirected by a respective optical element 420 toward the reflective spatial light modulator 450, or (ii) while the respective pixel is in the second state, absorb the light redirected by a respective optical element 420 toward the reflective spatial light modulator 450.

FIG. 4C is similar to FIG. 4B except that only a subset, less than all, of the pixels of the reflective spatial light modulator 450 is illuminated. For example, in FIG. 4C, the first switchable cell 430-2 is in a state (e.g., the first state) so that the first switchable cell 430-2 does not change the polarization of the transmitted light. The transmitted light, namely the second light 492, has the second polarization and the second optical element 420-2 transmits the second light 492 having the second polarization without redirecting (e.g., reflection or diffraction) the second light 492. Thus, the second group of pixels 450-2 of the plurality of pixels does not receive light and in turn, does not provide modulated light. Also in FIG. 4C, the second switchable cell 430-3 is in a state (e.g., the second state) so that the second switchable cell 430-3 changes the polarization of the transmitted light, namely the third light 494, (e.g., from RCP to an elliptical polarization) so that the first portion 494-1 of the third light 494 (e.g., the first portion 494-1 of the third light having the first polarization) is directed toward the third group of pixels 450-3 of the plurality of pixels while the second portion 494-2 of the third light 494 (e.g., the second portion 494-2 of the third light 494 having second polarization) is transmitted toward the third switchable cell 430-4. In FIG. 4C, the third switchable cell 430-4 is in a state (e.g., the first state) so that the third switchable cell 430-4 does not change the polarization of the transmitted light. The transmitted light, namely the fourth light 496, has the second polarization and the fourth optical element 420-4 transmits the fourth light 496 having the second polarization without redirecting (e.g., reflection or diffraction) the fourth light 496. Thus, the fourth group of pixels 450-4 of the plurality of pixels does not receive light and in turn, does not provide modulated light.

This zonal illumination of the reflective spatial light modulator 450 reduces or eliminates the need for illuminating the entire surface of the reflective spatial light modulator 450, which in turn, improves the efficiency, reduces energy consumption, increases operational time and battery life, and reduces the size and weight associated with energy storage (such as batteries) of a display device that includes the reflective spatial light modulator 450.

FIG. 4D is a schematic diagram illustrating optical paths in the optical element 420 shown in FIGS. 4A and 4B in accordance with some embodiments.

In some embodiments, a respective optical element 420 includes a reflective polarizer 422 (e.g., an optical element that reflects light having the first polarization and transmits light having the second polarization) that is configured to reflect light having the first polarization (e.g., a linear polarization, such as s-polarization, or a circular polarization, such as LCP) and to transmit light having the second polarization (e.g., a linear polarization, such as p-polarization, or a circular polarization, such as RCP). In such cases, a surface of a respective reflective polarizer 422 forms an angle with respect to a surface of the substrate 410 (e.g., the surface of the respective reflective polarizer 422 is non-parallel and non-perpendicular to the surface of the substrate 410). The angle may be between 10 and 80 degrees, between 20 and 70 degrees, between 30 and 60 degrees, or between 40 and 50 degrees.

In some embodiments, the reflective polarizer 422 is a reflective grating. The reflective grating is polarization-sensitive (or polarization-dependent). Thus, the reflective grating diffracts light having the first polarization in a reflective direction (e.g., the direction of a first portion 490-1 of the first light 490 shown in FIG. 4D) without diffracting light having the second polarization (e.g., a second portion 490-2 of the first light 490). In some embodiments, the reflective polarizer 422 reflects the light having the first polarization in the reflective direction without causing diffraction of the light.

In some embodiments, a respective optical element 420 of the plurality of optical elements 420 includes a reflective grating 422 or 522 (e.g., an optical component that diffracts light having the first polarization and impinging on a first side 422-1 or 522-1 of the optical component back toward the first side 422-1 or 522-1 of the optical component) that is configured to reflect light having the first polarization and transmit light having the second polarization. In some embodiments, the reflective grating 422 is positioned non-parallel and non-perpendicular to a surface of the substrate 410. In some embodiments, the reflective grating 422 has an optical surface that forms an angle between 0 degrees and 90 degrees with respect to the reflective spatial light modulator 450 (in some cases, not including the 0 degrees or the 90 degrees).

In some embodiments, a respective optical element of the plurality of optical elements 420 includes a layer of cholesteric optically anisotropic molecules (e.g., cholesteric liquid crystals) that is configured to reflect light having the first polarization (e.g., LCP) and to transmit light having the second polarization (e.g., RCP). In such cases, an optical surface of a respective layer of cholesteric optically anisotropic molecules is non-parallel and non-perpendicular to a surface of the substrate 410.

FIGS. 4E and 4F are schematic diagrams illustrating operations of a switchable cell 430 in accordance with some embodiments. FIGS. 4E and 4F illustrate a respective switchable cell of the one or more switchable cells 430 that includes optically anisotropic molecules 432. The optically anisotropic molecules 432 may be placed in a first state or a second state, for example, based on an electric field applied to (or across) the optically anisotropic molecules 432. While the optically anisotropic molecules 432 are in the first state, as shown in FIG. 4E, the optically anisotropic molecules 432 transmit light while changing a polarization of the light. For example, when the light impinging on the optically anisotropic molecules has RCP, the transmitted light may have LCP as shown in FIG. 4E, or a polarization different from RCP (e.g., an elliptical polarization). Alternatively, when the light impinging on the optically anisotropic molecules has s-polarization, the transmitted light may have p-polarization or a combination of p-polarization and s-polarization. While the optically anisotropic molecules 432 are in the second state, as shown in FIG. 4F, the optically anisotropic molecules 432 transmit light without changing the polarization of the light. In some embodiments, the direction of light is remains unchanged as the light passes through the respective switchable cell regardless of the state of the optically anisotropic molecules 432.

Although the operations of the switchable cell 430 are described above with respect to the optically anisotropic molecules 432 (or the switchable cell 430 containing the optically anisotropic molecules 432) being in the first state or the second state, the first state and the second state may be called differently (for example, the first state may be called the second state and the second state may be called the first state). Thus, in some configurations, while the optically anisotropic molecules 432 are in the second state, the optically anisotropic molecules 432 transmit light and change a polarization of the light, and while the optically anisotropic molecules 432 are in the second state, the optically anisotropic molecules 432 transmit light without changing the polarization of the light.

In some embodiments, a respective switchable cell of the one or more switchable cells 430 is independently controllable.

In some embodiments, a respective switchable cell of the one or more switchable cells 430 is coupled (e.g., electrically coupled) to a respective controller 434 that controls an orientation of the optically anisotropic molecules 432. In such cases, the controller is configured apply a voltage differential across the optically anisotropic molecules 432. As shown in FIGS. 4E and 4F, in some cases, the controller is configured to apply a first voltage differential V1 across the optically anisotropic molecules 432 (which places the optically anisotropic molecules 432 in the first state) and apply a second voltage differential V2 that is different from the first voltage differential V1 across the optically anisotropic molecules 432 (which places the optically anisotropic molecules 432 in the second state).

Figure 5A:
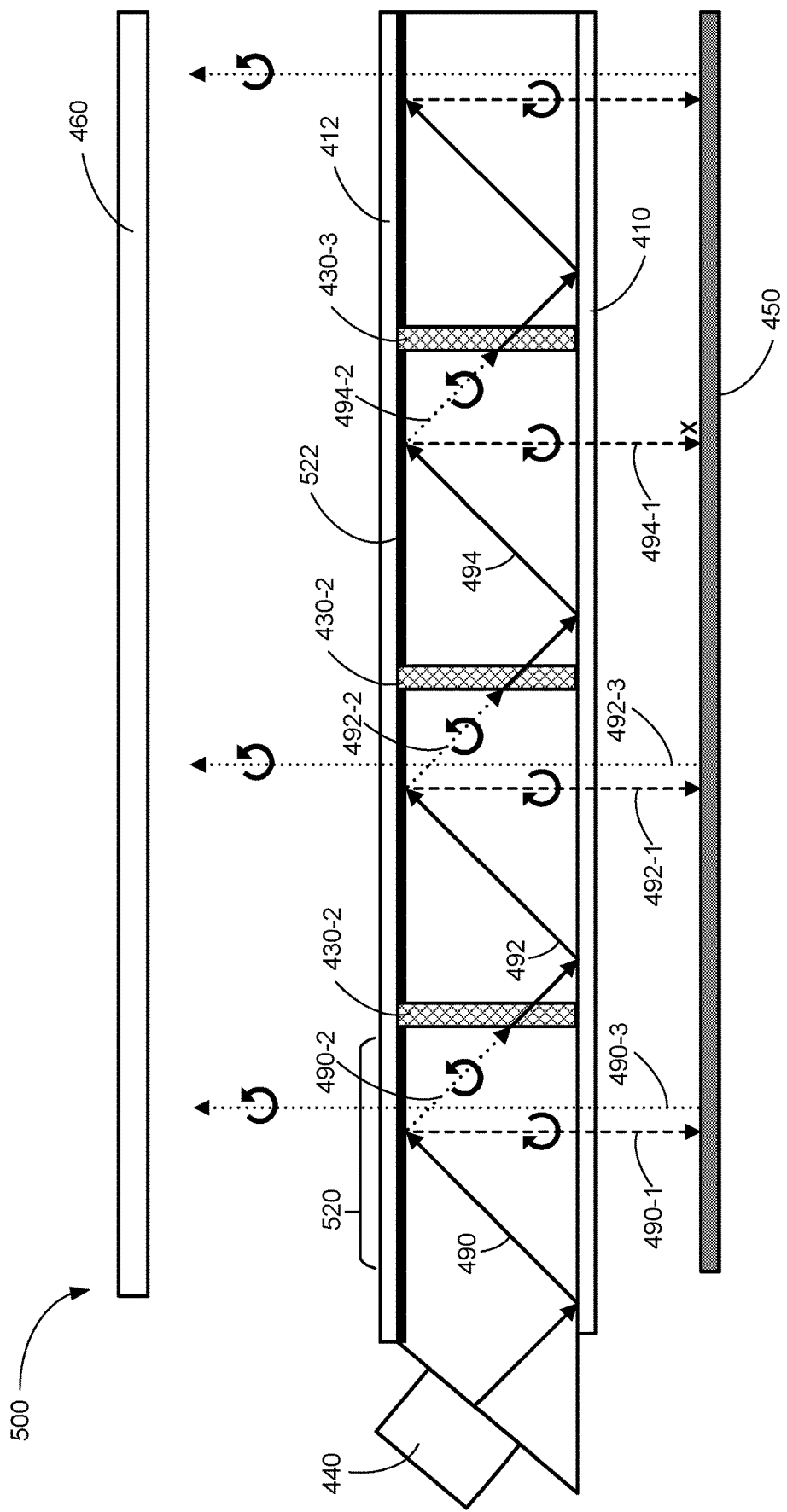
FIG. 5A is a schematic diagram illustrating a display device in accordance with some embodiments.

FIG. 5A is a schematic diagram illustrating display device 500 in accordance with some embodiments. Display device 500 is similar to the display device 402 with the exception that the plurality of optical elements 420 are replaced by a plurality of optical elements 520. Thus, the details of components of display device 500 that are described above with respect to display device 402 is not repeated herein for brevity.

Figure 5B:
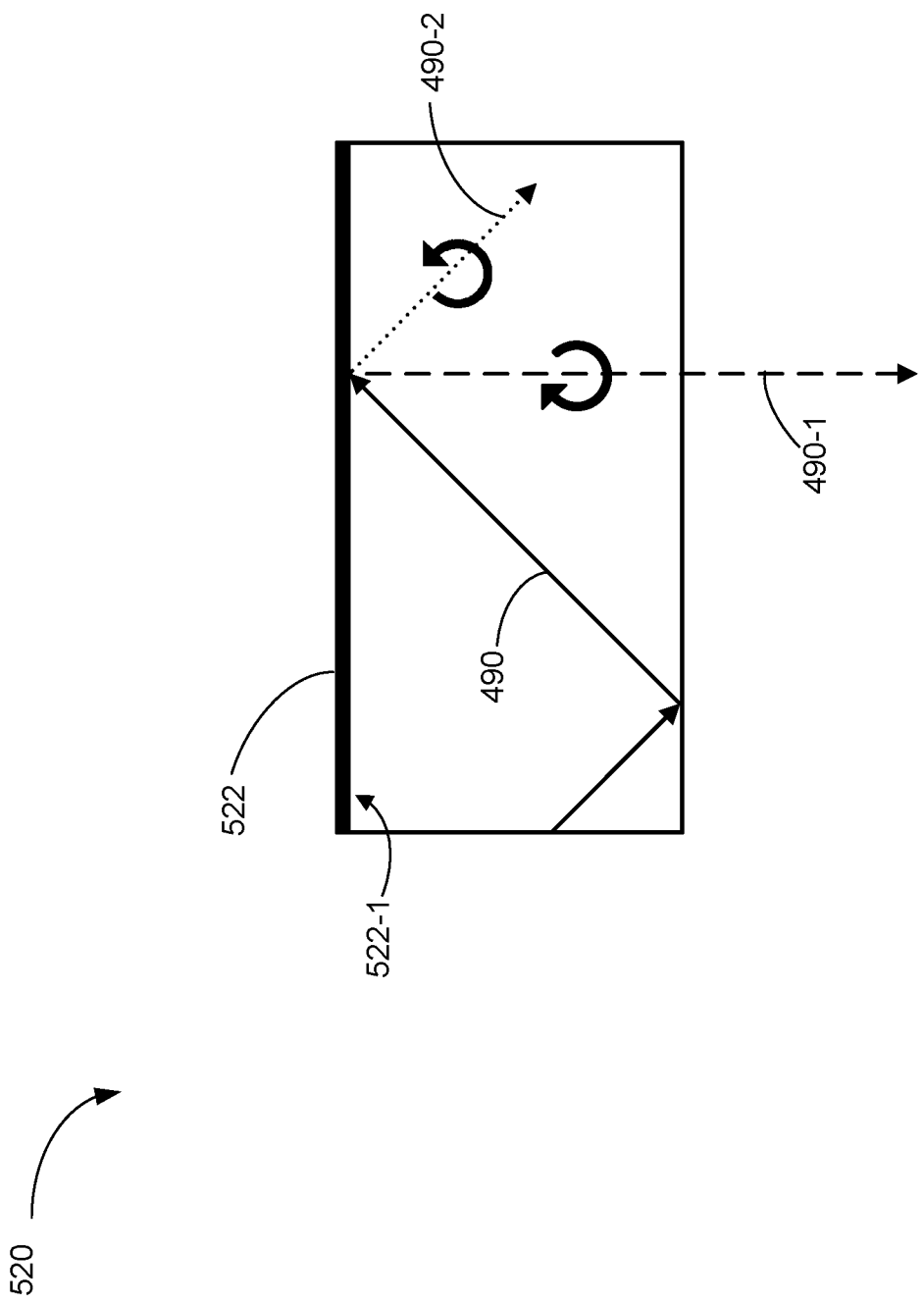
FIG. 5B is a schematic diagram illustrating optical paths in the optical element shown in FIG. 5A in accordance with some embodiments.

FIG. 5B is a schematic diagram illustrating optical paths in the optical element 520 shown in FIG. 5A in accordance with some embodiments. In some embodiments, as shown in FIG. 5B, a respective optical element of the plurality of optical elements 520 includes reflective grating 522. The reflective grating 522 is polarization-sensitive (or polarization-dependent). Thus, the reflective grating 522 diffracts light having the first polarization in a reflective direction (e.g., the direction of a first portion 490-1 of the first light 490 shown in FIG. 5B) without diffracting light having the second polarization (e.g., a second portion 490-2 of the first light 490). The light having the first polarization, after diffraction by the reflective grating 522, propagates in a direction that allows the light having the first polarization to exit from the optical element 520 without total internal reflection (e.g., the angle of the diffracted light relative to the exit surface of the optical element 520 is less than the critical angle determined based on the refractive index of the material constituting the optical element 520, such as glass). The light having the second polarization is reflected by total internal reflection and continues to propagate within the optical element 520. In some embodiments, the reflective grating 522 is disposed on the substrate 412 as shown in FIG. 5A.

Figure 5C:
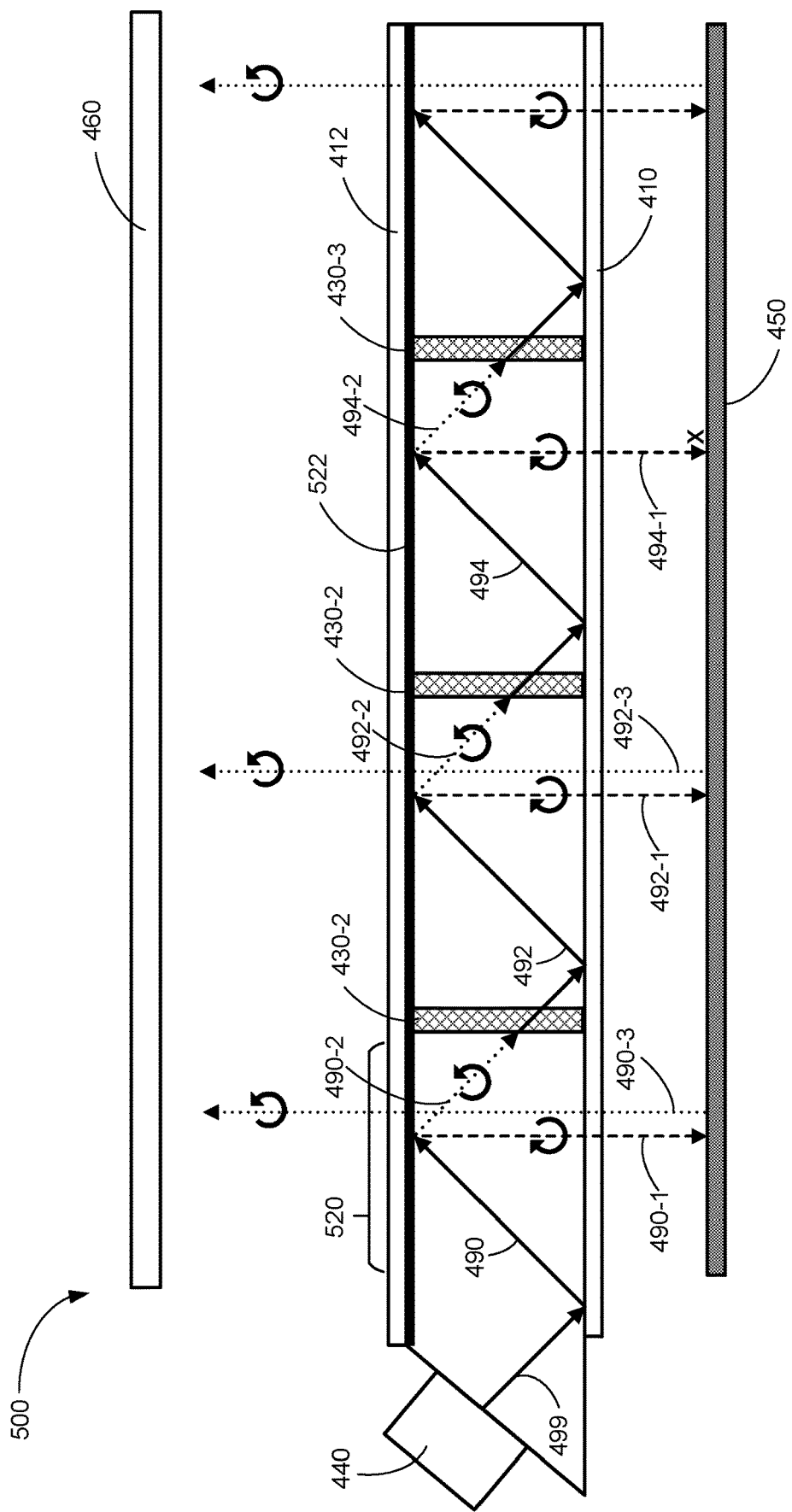
FIG. 5C is a schematic diagram illustrating a display device in accordance with some embodiments.

FIG. 5C is a schematic diagram illustrating a display device 500 in accordance with some embodiments. The display device 500 shown in FIG. 5C is similar to the display device 500 shown in FIG. 5A, except that a single contiguous reflective grating 522 may be disposed on the substrate 412 (e.g., the reflective grating 522 may be a coating) so that the reflective grating 522 encompasses more than one optical element 520 of the plurality of optical elements 520. For example, the reflective grating 522 is in contact with a plurality of optical elements 520.

Figure 6A:
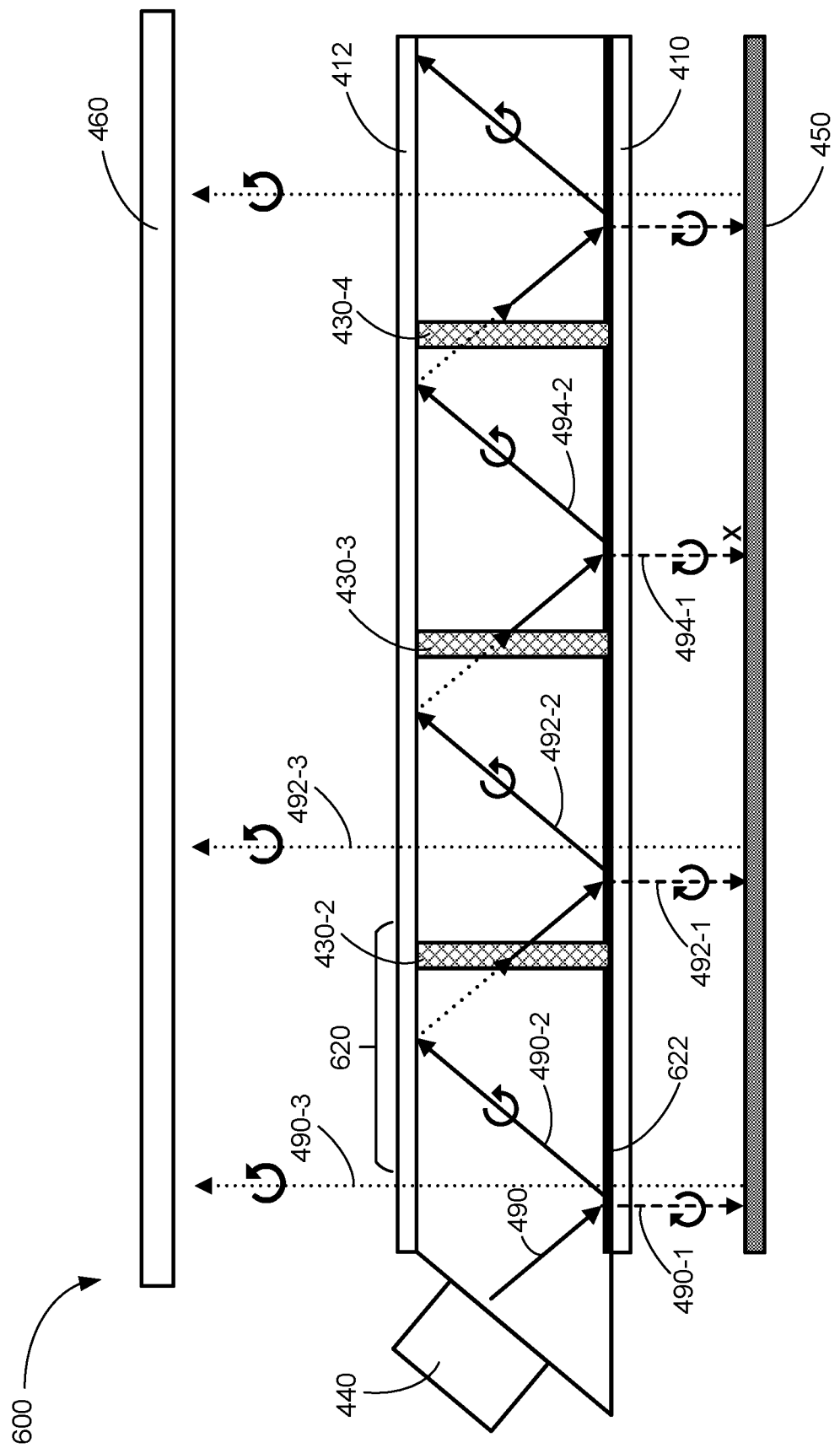
FIG. 6A is a schematic diagram illustrating a display device in accordance with some embodiments.

FIG. 6A is a schematic diagram illustrating a display device 600 in accordance with some embodiments. Display device 600 is similar to display devices 402 and 500 with the exception that the plurality of optical elements 420 or 520 are replaced by a plurality of optical elements 620. Thus, details of components of display device 600 that are described above with respect to display devices 402 and 500 are not repeated herein for brevity.

Figure 6B:
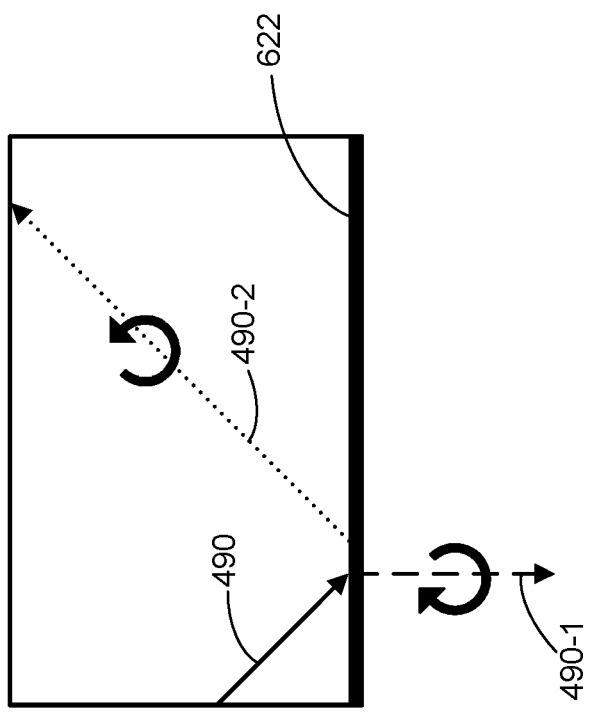
FIG. 6B is a schematic diagram illustrating optical paths in the optical element shown in FIG. 6A in accordance with some embodiments.

FIG. 6B is a schematic diagram illustrating optical paths in the optical element 620 shown in FIG. 6A in accordance with some embodiments. In some embodiments, as shown in FIG. 6B, a respective optical element of the plurality of optical elements 620 includes a transmissive grating 622. The transmissive grating 622 is polarization-sensitive (or polarization-dependent). Thus, the transmissive grating 622 diffracts light having the first polarization in a transmissive direction (e.g., the direction of a first portion 490-1 of the first light 490 shown in FIG. 6B) without diffracting light having the second polarization (e.g., a second portion 490-2 of the first light 490). The light having the first polarization, after diffraction by the transmissive grating 622, propagates in a direction that allows the light having the first polarization to exit from the optical element 620 without total internal reflection (e.g., the angle of the diffracted light relative to the exit surface of the optical element 620 is less than the critical angle determined based on the refractive index of the material constituting the optical element 620, such as glass). The light having the second polarization is reflected by total internal reflection and continues to propagate within the optical element 620. In some embodiments, the transmissive grating 622 is disposed on the substrate 410 as shown in FIG. 6A.

Figure 6C:
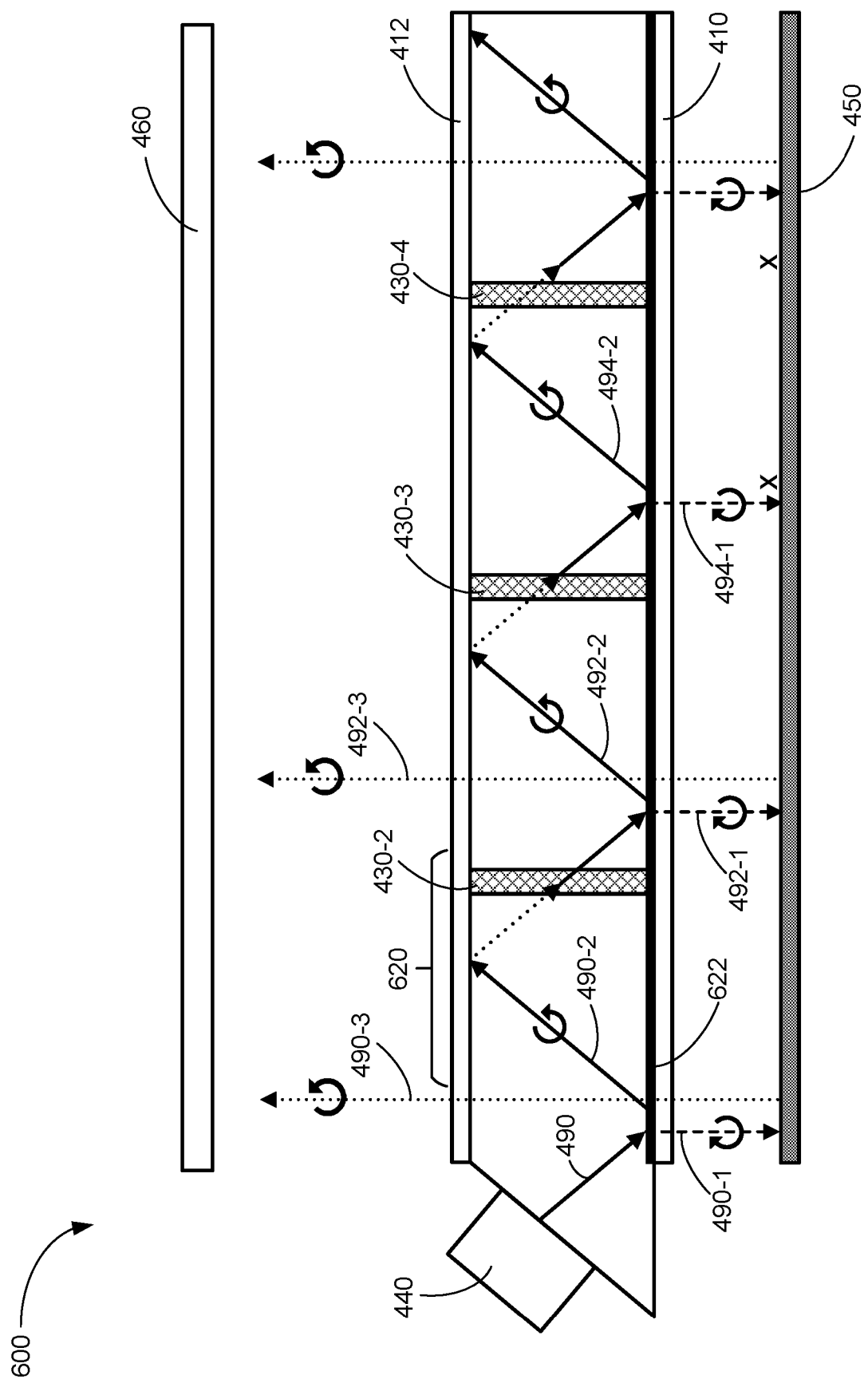
FIG. 6C is a schematic diagram illustrating a display device in accordance with some embodiments.

FIG. 6C is a schematic diagram illustrating a display device 600 in accordance with some embodiments. The display device 600 shown in FIG. 6C is similar to the display device 600 shown in FIG. 6A, except that a single contiguous transmissive grating 622 may be disposed on the substrate 412 (e.g., the transmissive grating 622 may be a coating) so that the transmissive grating 622 encompasses more than one optical element 620 of the plurality of optical elements 620. For example, the transmissive grating 622 is in contact with a plurality of optical elements 620.

Figure 7A:
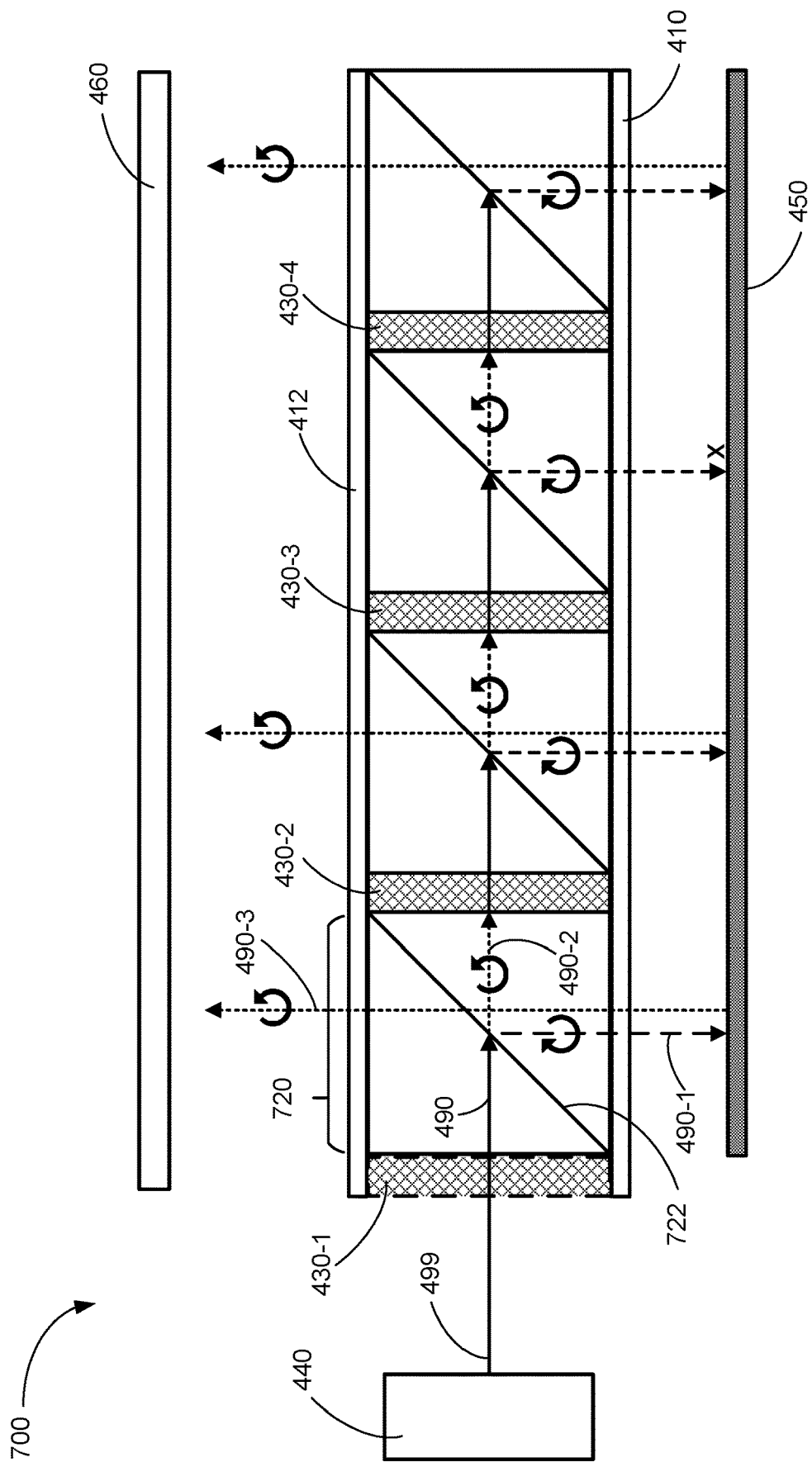
FIG. 7A is a schematic diagram illustrating a display device in accordance with some embodiments.

FIG. 7A is a schematic diagram illustrating a display device 700 in accordance with some embodiments. Display device 700 is similar to display devices 402, 500, and 600 with the exception that the plurality of optical elements 420, 520, or 620 are replaced by a plurality of optical elements 720. Thus, details of components of display device 700 that are described above with respect to display devices 402, 500, and 600 are not repeated herein for brevity.

Figure 7B:
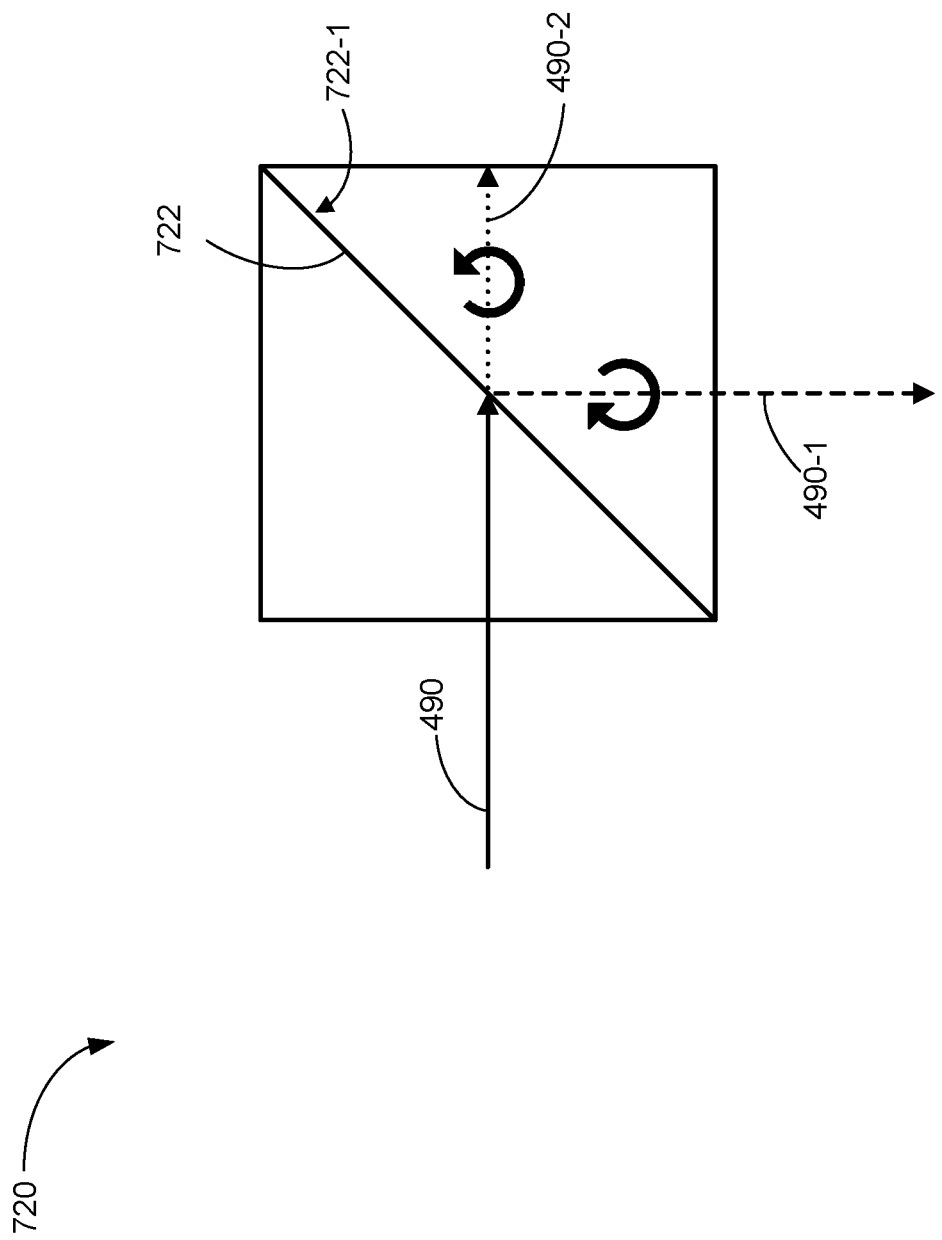
FIG. 7B is a schematic diagram illustrating optical paths in the optical element shown in FIG. 7A in accordance with some embodiments.

FIG. 7B is a schematic diagram illustrating optical paths in the optical element 720 shown in FIG. 7A in accordance with some embodiments. In some embodiments, as shown in FIG. 7B, a respective optical element of the plurality of optical elements 720 includes a transmissive grating 722. The transmissive grating 722 is polarization-sensitive (or polarization-dependent). Thus, the transmissive grating 722 diffracts light having the first polarization in a transmissive direction (e.g., the direction of a first portion 490-1 of the first light 490 shown in FIG. 7B) without diffracting light having the second polarization (e.g., a second portion 490-2 of the first light 490). The light having the first polarization, after diffraction by the transmissive grating 622, propagates in a direction that allows the light having the first polarization to exit from the optical element 720 (e.g., in a direction that is perpendicular to the exit surface of the optical element 720). In some cases, the light having the second polarization is transmitted in the direction of the first light 490 (e.g., toward a subsequent switchable cell). In some embodiments, the transmissive grating 722 is non-parallel and non-perpendicular to a surface of the substrate 410. In some embodiments, the transmissive grating 722 has an optical surface 722-1 that forms an angle between 0 degrees and 90 degrees with respect to the reflective spatial light modulator 450 (not including 0 degrees or 90 degrees).

Although FIGS. 4A-4C, 5A and 5C, 6A and 6C, and 7A illustrate a plurality of optical elements used in a display device, in some embodiments, a single optical element may be used for illuminating a reflective spatial light modulator. For example, a single optical element 420 may be used to illuminate a reflective spatial light modulator. In such implementation, the angle of the reflective polarizer 422 in the single optical element 420 is selected based on the length and height of the single optical element 420. In another example, a single optical element 720 may be used to illuminate the reflective spatial light modulator. Similarly, only one of the optical element 520 or the optical element 620 may be used to illuminate a reflective spatial light modulator. In such configurations, the display device may not include any switchable cell.

In some embodiments, a polarization sensitive grating described herein includes one or more of a polarization volume hologram, an anisotropic polymer film, a surface relief grating filled with anisotropic material (e.g., liquid crystals such as cholesteric liquid crystals or nematic liquid crystals), or a holographic polymer dispersed liquid crystal grating.

Figure 8A:
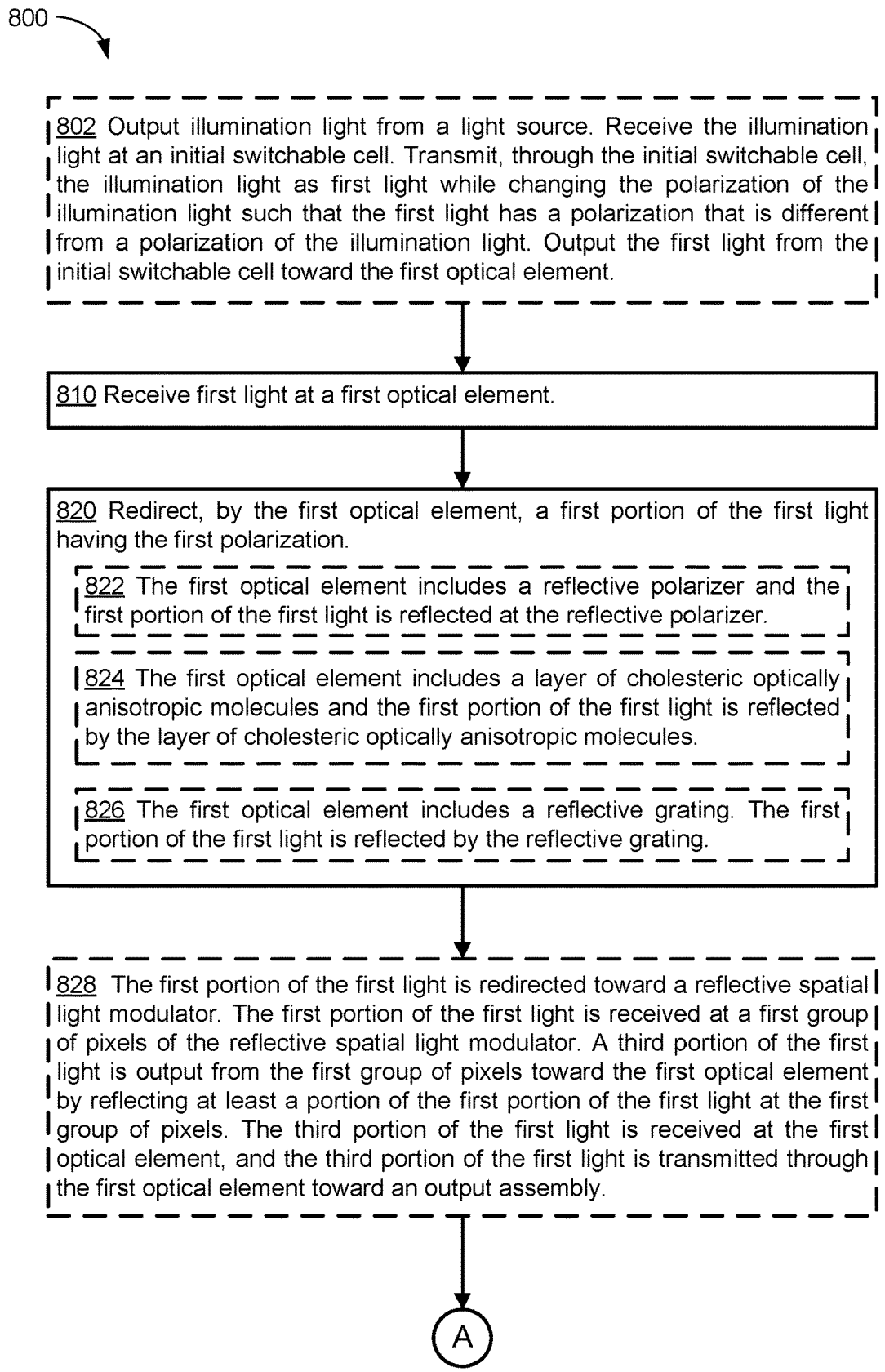
Figure 8B:
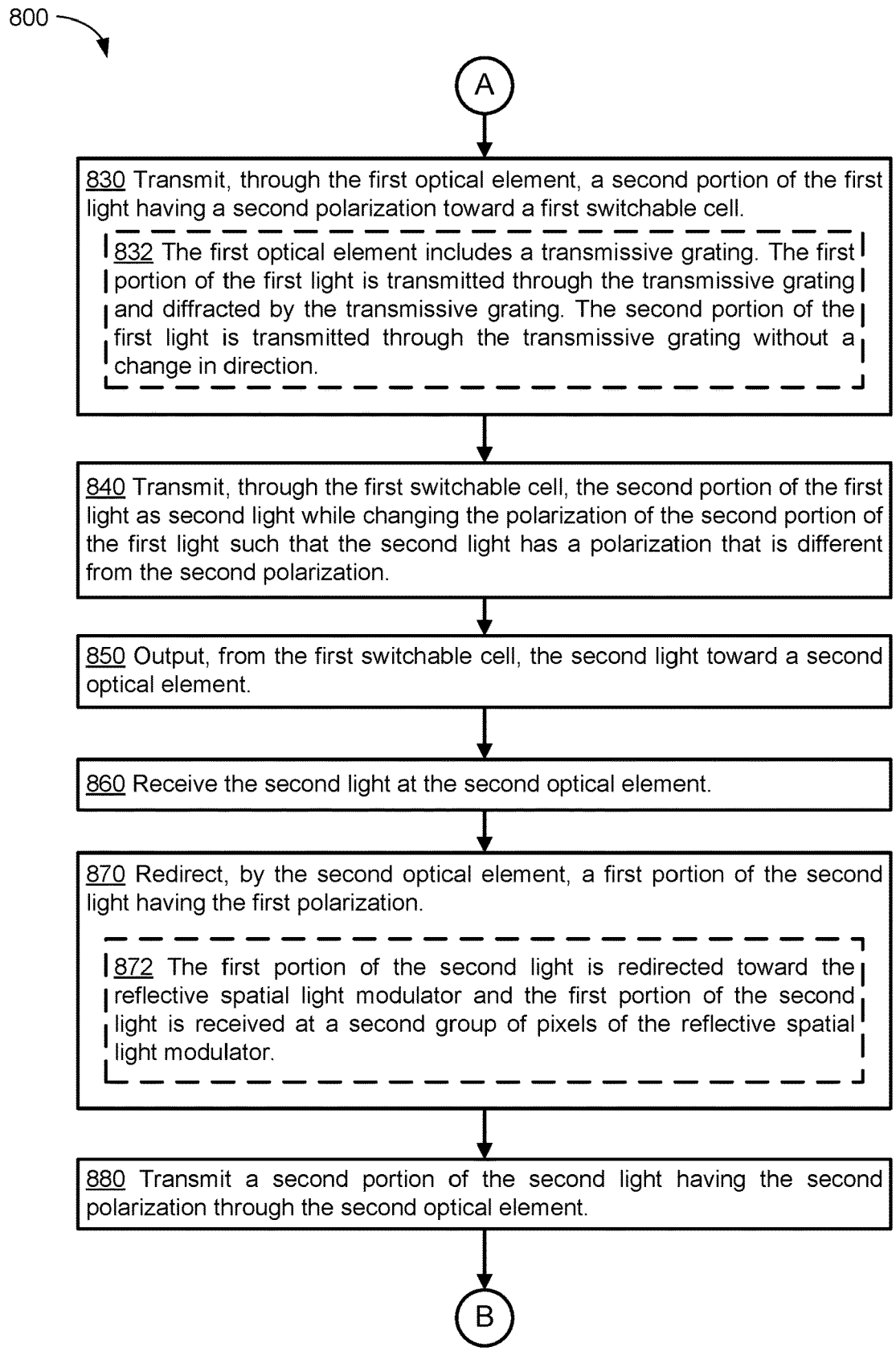

FIGS. 8A-8C are flow diagrams illustrating a method 800 in accordance with some embodiments. The method 800 includes (step 810) receiving first light 490 at a first optical element (e.g., first optical element 420-1, 520-1, 620-1, 720-1), (step 820) redirecting a first portion 490-1 of the first light 490 having the first polarization (e.g., LCP) by the first optical element, and (step 830) transmitting a second portion 490-2 of the first light 490 having a second polarization (e.g., RCP) through the first optical element and toward a first switchable cell 430-2. The method 800 also includes (step 840) transmitting, through the first switchable cell 430-2, the second portion 490-2 of the first light 490 as second light 492 while changing the polarization of the second portion 490-2 of the first light 490 so that the second light 490 has a polarization that is different from the second polarization. The method 800 further includes (step 850) outputting the second light 492 from the first switchable cell 430-2 toward a second optical element 420-2, (step 860) receiving the second light 492 by the second optical element 420-2, and (step 870) redirecting a first portion 492-1 of the second light 492 having the first polarization by the second optical element 420-2.

In some embodiments, (step 826) the first portion 490-1 of the first light 490 is redirected by the first optical element (e.g., first optical element 420-1, 520-1, 620-1, 720-1) toward a reflective spatial light modulator 450 and the method 800 further includes receiving the first portion 490-1 of the first light 490 at a first group of pixels 450-1 of the reflective spatial light modulator 450, outputting a third portion 490-3 of the first light 490 from the first group of pixels 450-1 toward the first optical element by reflecting at least a portion of the first portion 490-1 of the first light 490 at the first group of pixels 450-1, receiving the third portion 490-3 of the first light 490 at the first optical element, and transmitting the third portion 490-3 of the first light 490 through the first optical element toward an output assembly 460.

In some embodiments, (step 872) first portion 492-1 of the second light 492 is redirected by the second optical element (e.g., second optical element 420-2, 520-2, 620-2, 720-2) toward the reflective spatial light modulator 450 and the method 800 further includes receiving the first portion 492-1 of the second light 492 at a second group of pixels 450-2 of the reflective spatial light modulator 450.

In some embodiments, the method 800 further includes (step 890) receiving the second portion 492-2 of the second light 492 at a second switchable cell 430-3; transmitting, through the second switchable cell 430-3, the second portion 492-2 of the second light 492 as third light 494 while changing the polarization of the second portion 492-2 of the second light 492 so that the third light 494 has a polarization that is different from the second polarization; outputting the third light 494 from the second switchable cell 430-3 toward a third optical element 420-3; receiving the third light 494 at the third optical element 420-3; redirecting a first portion 494-1 of the third light 494 having the first polarization by the third optical element 420-3; and transmitting a second portion 494-2 of the third light 494 having the second polarization through the third optical element 420-3.

In some embodiments, (step 892) the first portion 494-1 of the third light 494 is redirected by the third optical element (e.g., third optical element 420-3, 520-3, 620-3, 720-3) toward the reflective spatial light modulator 450 and the method 800 further includes receiving the first portion 494-1 of the third light 494 at a third group of pixels 450-3 of the reflective spatial light modulator 450 and absorbing the first portion 494-1 of the third light 494 at the third group of pixels 450-3 so that the first portion 494-1 of the third light 494 is not output from the reflective spatial light modulator 450.

In some embodiments, the method 800 further includes (step 802) outputting illumination light 499 from a light source; receiving the illumination light 499 at an initial switchable cell 430-1; transmitting, through the initial switchable cell 430-1, the illumination light 499 as first light 490 while changing the polarization of the illumination light 499 so that the first light 490 has a polarization that is different from a polarization of the illumination light 499; and outputting the first light 490 from the initial switchable cell 430-1 toward the first optical element (e.g., first optical element 420-1, 520-1, 620-1, 720-1).

In some embodiments, (step 822) the first optical element 420-1 or 520-1 includes a reflective polarizer 422 or 522, and redirecting the first portion 490-1 of the first light 490 includes reflecting the first portion 490-1 of the first light 490 at the reflective polarizer 422 or 522.

In some embodiments, (step 824) the first optical element 420-1 includes a layer of cholesteric optically anisotropic molecules and redirecting the first portion 490-1 of the first light 490 includes reflecting the first portion 490-1 of the first light 490 by the layer of cholesteric optically anisotropic molecules.

In some embodiments, (step 826) the first optical element 420-1 or 520-1 includes a reflective grating 422 or 522 and redirecting the first portion 490-1 of the first light 490 includes reflecting the first portion 490-1 of the first light 490 by the reflective grating 422 or 522. In some embodiments, as shown in FIGS. 4A-4D, the reflective grating 422 has an optical surface 422-1 that forms an angle between 0 degrees and 90 degrees with respect to the substrate 410 and/or a surface of the reflective spatial light modulator 450. In some embodiments, as shown in FIGS. 5A-5C, the reflective grating 522 is disposed on the substrate 410.

In some embodiments, (step 832) the first optical element 620-1 or 720-1 includes a transmissive grating 622 or 722 and (step 820) redirecting the first portion of the first light includes: (i) transmitting the first portion 490-1 of the first light 490 through the transmissive grating 622 or 722 and (ii) diffracting the first portion 490-1 of the first light 490 with the transmissive grating 622 or 722. Additionally, transmitting the second portion 490-2 of the first light 490 through the transmissive grating 622 or 722 includes transmitting the second portion 490-2 of the first light 490 without diffracting the second portion 490-2 of the first light (e.g., without a change in direction). In some embodiments, as shown in FIGS. 6A-6C, the transmissive grating 622 is disposed on the substrate 410. In some embodiments, as shown in FIGS. 7A-7B, the transmissive grating 722 has an optical surface 722-1 that forms an angle between 0 degrees and 90 degrees with respect to the substrate 410 and/or a surface of the reflective spatial light modulator 450.

In light of these principles, we now turn to certain embodiments of display devices.

In accordance with some embodiments, an optical device (e.g., optical device 400) includes a substrate (e.g., substrate 410 or 412), a plurality of optical elements (e.g., optical element 420, 520, 620, or 720), and one or more switchable cells (e.g., switchable cells 430). The plurality of optical elements are positioned on the substrate. A respective optical element of the plurality of optical elements is configured to redirect light having a first polarization (e.g., LCP) and transmit light having a second polarization (e.g., RCP) that is orthogonal to the first polarization. The plurality of optical elements include a first optical element (e.g., first optical element 420-1, 520-1, 620-1, or 720-1) that is located on a first region (e.g., first region 411-1) of the substrate (e.g., substrate 410) and a second optical element (e.g., second optical element 420-2, 520-2, 620-2, or 720-2) that is located on a second region (e.g., second region 411-2) of the substrate. A respective switchable cell of the one or more switchable cells includes optically anisotropic molecules (e.g., optically anisotropic molecules 432). The one or more switchable cells includes a first switchable cell (e.g., first switchable cell 430-2) located on a first cell location (e.g., first cell location 413-1) of the substrate between the first region and the second region of the substrate.

In some embodiments, a first optical element (e.g., first optical element 420-1) of the plurality of optical elements (e.g., optical elements 420) is configured to receive first light (e.g., first light 490), redirect a first portion (e.g., first portion 490-1) of the first light having the first polarization (e.g., LCP), and transmit a second portion (e.g., second portion 490-2) of the first light having the second polarization (e.g., RCP) toward a first switchable cell (e.g., first switchable cell 430-2) of the one or more switchable cells (e.g., switchable cells 430). The first switchable cell is configured to transmit the second portion (e.g., second portion 490-2) of the first light as second light (e.g., second light 492) while changing the polarization of the second portion of the first light so that the second light has a polarization that is different from the second polarization (e.g., LCP or elliptically polarized). The second light is output from the first switchable cell toward a second optical element (e.g., second optical element 420-2, 520-2, 620-2, or 720-2) of the plurality of optical elements (e.g., optical element 420, 520, 620, or 720). The second optical element of the plurality of optical elements is configured to receive the second light, redirect a first portion (e.g., first portion 492-1) of the second light having the first polarization, and transmit a second portion (e.g., second portion 492-2) of the second light having the second polarization.

In some embodiments, the one or more switchable cells (e.g., switchable cells 430) include a second switchable cell (e.g., second switchable cell 430-3), the second switchable cell is configured to transmit the second portion (e.g., second portion 494-2) of the second light as third light (e.g., third light 494) while changing the polarization of the second portion of the second light so that the third light has a polarization that is different from the second polarization (e.g., LCP or elliptically polarized). The third light is output from the second switchable cell toward a third optical element (e.g., third optical element 420-3, 520-3, 620-3, or 720-3) of the plurality of optical elements (e.g., optical element 420, 520, 620, or 720). The third optical element of the plurality of optical elements is configured to receive the third light, redirect a first portion (e.g., first portion 494-1) of the third light having the first polarization (e.g., LCP), and transmit a second portion (e.g., second portion 496-2) of the third light having the second polarization (e.g., RCP). The second optical element is disposed between the first switchable cell and the second switchable cell, and the second switchable cell is disposed between the second optical element and the third optical element.

In some embodiments, a light source (e.g., light source 440) is configured to output illumination light (e.g., illumination light 499). The one or more switchable cells (e.g., switchable cells 430) include an initial switchable cell (e.g., initial switchable cell 430-1). The initial switchable cell is configured to receive the illumination light and transmit the illumination light as first light (e.g., first light 490) while changing the polarization of the illumination light so that the first light has a polarization that is different from the polarization of the illumination light. The first optical element (e.g., first optical element 420-1, 520-1, 620-1, or 720-1) is disposed between the initial switchable cell and the first switchable cell (e.g., first switchable cell 430-2).

In some embodiments, a respective switchable cell of the one or more switchable cells (e.g., switchable cells 430) is independently controllable.

In some embodiments, a respective switchable cell of the one or more switchable cells (e.g., switchable cells 430) includes optically anisotropic molecules (e.g., optically anisotropic molecules 432). The respective switchable cell is configurable to control a polarization of the transmitted light by changing a voltage differential across the respective switchable cell, thereby changing an alignment of the optically anisotropic molecules in the respective switchable cell.

In some embodiments, a respective optical element of the plurality of optical elements (e.g., optical element 420, 520, 620, or 720) includes a reflective polarizer (e.g., reflective polarizer 422). A surface (e.g., optical surface 422-1) of a respective reflective polarizer forms an angle (e.g., angle θ) with respect to a surface of the substrate (e.g., substrate 410 or 412). The respective reflective polarizer is configured to reflect light having the first polarization (e.g., LCP) and to transmit light having the second polarization (e.g., RCP).

In some embodiments, a respective optical element of the plurality of optical elements (e.g., optical element 420, 520, 620, or 720) includes a layer of cholesteric optically anisotropic molecules. An optical surface of a respective layer of cholesteric optically anisotropic molecules is non-parallel and non-perpendicular to a surface of the substrate (e.g., substrate 410 or 412). The respective layer of cholesteric optically anisotropic molecules is configured to reflect light having the first polarization (e.g., LCP) and to transmit light having the second polarization (e.g., RCP).

In some embodiments, a respective optical element of the plurality of optical elements (e.g., optical element 620 or 720) includes a transmissive grating (e.g., transmissive grating 622 or 722). The transmissive grating (e.g., transmissive grating 722) is non-parallel and non-perpendicular to a surface of the substrate (e.g., substrate 410 or 412). The transmissive grating is configured to transmit and redirect the light having the first polarization (e.g., LCP), and to transmit light having the second polarization (e.g., RCP) without a change in direction.

In some embodiments, a respective optical element of the plurality of optical elements (e.g., optical element 420, or 520) includes a reflective grating (e.g., reflective grating 422 or 522). The reflective grating (e.g., reflective grating 422) is non-parallel and non-perpendicular to a surface of the substrate (e.g., substrate 410 or 412). The reflective grating is configured to reflect light having the first polarization (e.g., LCP), and transmit light having the second polarization (e.g., RCP).

In some embodiments, a display device (e.g., display device 402, 500, 600, 700) includes a light source (e.g., light source 440), a reflective spatial light modulator 450, and the optical device (e.g., optical device 400). The light source is configured to output illumination light (e.g., illumination light 499 or light based on the illumination light 499, such as first light 490). The reflective spatial light modulator (e.g., reflective spatial light modulator 450) is configured to receive at least a portion of the illumination light and output modulated light (e.g., light 490-3 and 492-3, 496-3). The optical device is positioned to receive the illumination light, output at least a portion (e.g., light 490-1, 492-1, 492-1, 496-1) of the illumination light toward the reflective spatial light modulator, receive the modulated light output from the reflective spatial light modulator, and transmit the modulated light output from the reflective spatial light modulator.

In some embodiments, the modulated light (e.g., light 490-3 and 492-3, 496-3) corresponds to one or more images.

In some embodiments, the display device (e.g., display device 402, 500, 600, 700) further includes an output assembly (e.g., output assembly 460) configured to receive the modulated light (e.g., light 490-3 and 492-3, 496-3) output from the reflective spatial light modulator (e.g., reflective spatial light modulator 450) and transmitted through the optical device.

In accordance with some embodiments, a method (e.g., method 800) includes (step 810) receiving first light (e.g., first light 490) at a first optical element (e.g., first optical element 420-1, 520-1, 620-1, or 720-1), and (step 820) redirecting a first portion (e.g., first portion 490-1) of the first light having a first polarization (e.g., LCP) by the first optical element (e.g., first optical element 420-1). The method also includes (step 830) transmitting, through the first optical element, a second portion (e.g., second portion 490-2) of the first light having a second polarization (e.g., RCP) toward a first switchable cell (e.g., first switchable cell 430-2). The second polarization is orthogonal to the first polarization. The method also includes (step 840) transmitting, through the first switchable cell, the second portion of the first light as second light (e.g., second light 492) while changing the polarization of the second portion of the first light so that the second light has a polarization that is different from the second polarization (e.g., LCP or an elliptical polarization). The method also includes (step 850) outputting the second light from the first switchable cell toward a second optical element (e.g., second optical element 420-2, 520-2, 620-2, or 720-2), (step 860) receiving the second light at the second optical element, (step 870) redirecting a first portion (e.g., first portion 492-1) of the second light having the first polarization by the second optical element, and (step 880) transmitting a second portion (e.g., second portion 492-2) of the second light having the second polarization by the second optical element.

In some embodiments, the method (e.g., method 800) further includes (step 890) receiving the second portion (e.g., second portion 492-2) of the second light (e.g., second light 492) at a second switchable cell (e.g., second switchable cell 430-3); transmitting, through the second switchable cell, the second portion of the second light as third light (e.g., third light 494) while changing the polarization of the second portion of the second light so that the third light has a polarization that is different from the second polarization (e.g., LCP or elliptical polarization); outputting the third light toward a third optical element (e.g., third optical element 420-3, 520-3, 620-3, or 720-3) from the second switchable cell (e.g., second switchable cell 430-3); receiving the third light at the third optical element; redirecting a first portion (e.g., first portion 494-1) of the third light having the first polarization (e.g., LCP) by the third optical element; and transmitting a second portion (e.g., second portion 496-2) of the third light having the second polarization (e.g., RCP) by the third optical element.

In some embodiments, the method (e.g., method 800) further includes (step 802) outputting illumination light (e.g., illumination light 499) from a light source (e.g., light source 440), receiving the illumination light at an initial switchable cell (e.g., initial switchable cell 430-1), transmitting the illumination light through the initial switchable cell as first light (e.g., first light 490) while changing the polarization of the illumination light so that the first light has a polarization that is different from a polarization of the illumination light, and outputting the first light from the initial switchable cell and toward the first optical element (e.g., first optical element 420-1, 520-1, 620-1, or 720-1).

In some embodiments, (step 822) the first optical element (e.g., first optical element 420-1) includes a reflective polarizer (e.g., reflective polarizer 422), and redirecting the first portion (e.g., first portion 490-1) of the first light (e.g., first light 490) includes reflecting the first portion of the first light at the reflective polarizer.

In some embodiments, (step 824) the first optical element (e.g., first optical element 420-1) includes a layer of cholesteric optically anisotropic molecules, and redirecting the first portion (e.g., first portion 490-1) of the first light (e.g., first light 490) includes reflecting the first portion of the first light by the layer of cholesteric optically anisotropic molecules.

In some embodiments, (step 832) the first optical element (e.g., first optical element 620-1 or 720-1) includes a transmissive grating (e.g., transmissive grating 622 or 722), and redirecting the first portion (e.g., first portion 490-1) of the first light (e.g., first light 490) includes transmitting the first portion of the first light through the transmissive grating and diffracting the first portion of the first light with the transmissive grating. Additionally, transmitting the second portion (e.g., second portion 492-2) of the first light through the transmissive grating includes transmitting the second portion of the first light without a change in direction.

In some embodiments, (step 826) the first optical element (e.g., first optical element 420-1 or 520-1) includes a reflective grating (e.g., reflective grating 422 or 522), and redirecting the first portion (e.g., first portion 490-1) of the first light (e.g., first light 490) includes reflecting the first portion of the first light by the reflective grating.

In some embodiments, (step 828) the first portion (e.g., first portion 490-1) of the first light (e.g., first light 490) is redirected by the first optical element (e.g., first optical element 420-1, 520-1, 620-1, 720-1) toward a reflective spatial light modulator (e.g., reflective spatial light modulator 450) and the method (e.g., method 800) further includes receiving the first portion of the first light at a first group of pixels (e.g., first group of pixels 450-1) of the reflective spatial light modulator, outputting a third portion (e.g., third portion 490-3) of the first light (e.g., first light 490) from the first group of pixels (e.g., first group of pixels 450-1) toward the first optical element (e.g., first optical element 420-1, 520-1, 620-1, or 720-1) by reflecting at least a portion of the first portion of the first light at the first group of pixels, receiving the third portion of the first light at the first optical element, and transmitting the third portion of the first light through the first optical element toward an output assembly (e.g., output assembly 460).

In some embodiments, (step 872) first portion 492-1 of the second light 492 is redirected by the second optical element (e.g., second optical element 420-2, 520-2, 620-2, 720-2) toward the reflective spatial light modulator 450 and the method 800 further includes receiving the first portion 492-1 of the second light 492 at a second group of pixels 450-2 of the reflective spatial light modulator 450.

In some embodiments, the method 800 further includes (step 890) receiving the second portion (e.g., second portion 492-2) of the second light (e.g., second light 492) at a second switchable cell (e.g., second switchable cell 430-3); transmitting, through the second switchable cell, the second portion (e.g., second portion 492-2) of the second light (e.g., second light 492) as third light (e.g., third light 494) while changing the polarization of the second portion of the second light so that the third light has a polarization that is different from the second polarization; outputting the third light from the second switchable cell toward a third optical element (e.g., third optical element 420-3); receiving the third light at the third optical element; redirecting a first portion (e.g., first portion 494-1) of the third light having the first polarization by the third optical element; and transmitting a second portion (e.g., second portion 494-2) of the third light having the second polarization through the third optical element.

In some embodiments, (step 892) the first portion (e.g., first portion 494-1) of the third light (e.g., third light 494) is redirected by the third optical element (e.g., third optical element 420-3, 520-3, 620-3, 720-3) toward the reflective spatial light modulator (e.g., reflective spatial light modulator 450) and the method (e.g., method 800) further includes receiving the first portion of the third light at a third group of pixels (e.g., third group of pixels 450-3) of the reflective spatial light modulator and absorbing the first portion of the third light at the third group of pixels so that the first portion of the third light 494 is not output from the reflective spatial light modulator.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
a substrate;
a plurality of optical elements positioned on the substrate, a respective optical element of the plurality of optical elements being configured to redirect light having a first polarization and transmit light having a second polarization orthogonal to the first polarization, the plurality of optical elements including a first optical element located on a first region of the substrate and a second optical element located on a second region of the substrate; and
one or more switchable cells, a respective switchable cell of the one or more switchable cells including optically anisotropic molecules, the one or more switchable cells including a first switchable cell located on a first cell location of the substrate between the first region and the second region of the substrate, wherein:
a first optical element of the plurality of optical elements is configured to:
receive first light;
redirect a first portion of the first light having the first polarization; and
transmit a second portion of the first light having the second polarization toward a first switchable cell of the one or more switchable cells;
the first switchable cell is configured to change the polarization of the second portion of the first light while transmitting the second portion of the first light as second light so that the second light has a polarization that is different from the second polarization, wherein the second light is output, from the first switchable cell, toward a second optical element of the plurality of optical elements; and
the second optical element of the plurality of optical elements is configured to:
receive the second light;
redirect a first portion of the second light having the first polarization; and
transmit a second portion of the second light having the second polarization.

2. The optical device of claim 1, wherein:
the one or more switchable cells include a second switchable cell, the second switchable cell is configured to transmit the second portion of the second light as third light while changing the polarization of the second portion of the second light so that the third light has a polarization that is different from the second polarization, wherein the third light is output, from the second switchable cell, toward a third optical element of the plurality of optical elements;
the third optical element of the plurality of optical elements is configured to:
receive the third light;
redirect a first portion of the third light having the first polarization; and
transmit a second portion of the third light having the second polarization;
the second optical element is disposed between the first switchable cell and the second switchable cell; and
the second switchable cell is disposed between the second optical element and the third optical element.

3. The optical device of claim 1, further comprising:
a light source configured to output illumination light, wherein:
the one or more switchable cells include an initial switchable cell, the initial switchable cell being configured to receive the illumination light and transmit the illumination light as first light while changing the polarization of the illumination light so that the first light has a polarization that is different from the polarization of the illumination light; and
the first optical element is disposed between the initial switchable cell and the first switchable cell.

4. The optical device of claim 1, wherein a respective switchable cell of the one or more switchable cells is independently controllable.

5. The optical device of claim 1, wherein:
a respective switchable cell of the one or more switchable cells includes optically anisotropic molecules; and
the respective switchable cell is configurable to control a polarization of light transmitted through the respective switchable cell by changing a voltage differential across the respective switchable cell, thereby changing an alignment of the optically anisotropic molecules in the respective switchable cell.

6. The optical device of claim 1, wherein:
a respective optical element of the plurality of optical elements includes a reflective polarizer;

a surface of a respective reflective polarizer forms an angle with respect to a surface of the substrate; and
the respective reflective polarizer is configured to reflect light having the first polarization and to transmit light having the second polarization.

7. The optical device of claim 1, wherein:
a respective optical element of the plurality of optical elements includes a layer of cholesteric optically anisotropic molecules;
an optical surface of a respective layer of cholesteric optically anisotropic molecules is non-parallel and non-perpendicular to a surface of the substrate; and
the respective layer of cholesteric optically anisotropic molecules is configured to reflect light having the first polarization and to transmit light having the second polarization.

8. The optical device of claim 1, wherein:
a respective optical element of the plurality of optical elements includes a transmissive grating;
the transmissive grating is non-parallel and non-perpendicular to a surface of the substrate; and
the transmissive grating is configured to:
transmit and redirect the light having the first polarization; and
transmit light having the second polarization without a change in direction.

9. The optical device of claim 1, wherein:
a respective optical element of the plurality of optical elements includes a reflective grating;
the reflective grating is non-parallel and non-perpendicular to a surface of the substrate; and
the reflective grating is configured to:
reflect light having the first polarization; and
transmit light having the second polarization.

10. A display device, comprising:
a light source configured to output illumination light;
a reflective spatial light modulator configured to:
receive at least a portion of the illumination light; and
output modulated light; and
the optical device of claim 1, wherein the optical device is positioned to:
receive the illumination light;
output at least a portion of the illumination light toward the reflective spatial light modulator;
receive the modulated light output from the reflective spatial light modulator; and
transmit the modulated light output from the reflective spatial light modulator.

11. The display device of claim 10, wherein the modulated light corresponds to one or more images.

12. The display device of claim 10, further comprising an output assembly configured to receive the modulated light output from the reflective spatial light modulator and transmitted through the optical device.

13. A method, comprising:
receiving first light at a first optical element;
redirecting a first portion of the first light having a first polarization by the first optical element;
transmitting, through the first optical element, a second portion of the first light having a second polarization toward a first switchable cell, the second polarization being orthogonal to the first polarization;
changing the polarization of the second portion of the first light by transmitting, through the first switchable cell, the second portion of the first light as second light so that the second light has a polarization that is different from the second polarization;
outputting, from the first switchable cell, the second light toward a second optical element;
receiving the second light at the second optical element;
redirecting, by the second optical element, a first portion of the second light having the first polarization; and
transmitting, by the second optical element, a second portion of the second light having the second polarization.

14. The method of claim 13, further comprising:
receiving, at a second switchable cell, the second portion of the second light;
transmitting, through the second switchable cell, the second portion of the second light as third light while changing the polarization of the second portion of the second light so that the third light has a polarization that is different from the second polarization;
outputting, from the second switchable cell, the third light toward a third optical element;
receiving the third light at the third optical element;
redirecting, by the third optical element, a first portion of the third light having the first polarization; and
transmitting, by the third optical element, a second portion of the third light having the second polarization.

15. The method of claim 13, further comprising:
outputting illumination light from a light source;
receiving the illumination light at an initial switchable cell;
transmitting, through the initial switchable cell, the illumination light as first light while changing the polarization of the illumination light so that the first light has a polarization that is different from a polarization of the illumination light; and
outputting, from the initial switchable cell, the first light toward the first optical element.

16. The method of claim 13, wherein:
the first optical element includes a reflective polarizer; and
redirecting the first portion of the first light includes reflecting the first portion of the first light at the reflective polarizer.

17. The method of claim 13, wherein:
the first optical element includes a layer of cholesteric optically anisotropic molecules; and
redirecting the first portion of the first light includes reflecting the first portion of the first light by the layer of cholesteric optically anisotropic molecules.

18. The method of claim 13, wherein:
the first optical element includes a transmissive grating;
redirecting the first portion of the first light includes:
transmitting the first portion of the first light through the transmissive grating; and
diffracting the first portion of the first light with the transmissive grating; and
transmitting, through the transmissive grating, the second portion of the first light includes transmitting the second portion of the first light without a change in direction.

19. The method of claim 13, wherein:
the first optical element includes a reflective grating; and
redirecting the first portion of the first light includes reflecting the first portion of the first light by the reflective grating.

* * * * *